United States Patent [19]
Iwata

[11] Patent Number: 5,881,295
[45] Date of Patent: Mar. 9, 1999

[54] DATA PROCESSOR WHICH CONTROLS INTERRUPTS DURING PROGRAMMING AND ERASING OF ON-CHIP ERASABLE AND PROGRAMMABLE NON-VOLATILE PROGRAM MEMORY

[75] Inventor: Katsumi Iwata, Kokubunzi, Japan

[73] Assignee: Hitachi, Ltd., Tokyo, Japan

[21] Appl. No.: 594,022

[22] Filed: Jan. 29, 1996

[30] Foreign Application Priority Data

Feb. 7, 1995 [JP] Japan .................................. 7-042301
Dec. 27, 1995 [JP] Japan .................................. 7-353256

[51] Int. Cl.[6] ................................................ G06F 9/22
[52] U.S. Cl. ................................. 395/735; 711/103
[58] Field of Search ................................. 395/735, 565; 711/103

[56] References Cited

U.S. PATENT DOCUMENTS 5,410,711  4/1995  Stewart ............................... 395/750
5,539,890  7/1996  Rahman ............................... 395/375
5,603,038  2/1997  Crump ................................. 395/750

FOREIGN PATENT DOCUMENTS 6-180664  6/1994  Japan .

Primary Examiner—Eric Coleman
Attorney, Agent, or Firm—Loudermilk & Associates

[57] ABSTRACT

To obtain a correct vector address even if an interrupt occurs during erasing or programming of the data in a built-in ROM 18 by moving a part of a built-in RAM13 to a vector address area by a bus controller 27. Thereby, a microcomputer is prevented from running away and the safety of a system is improved at the time of on-board programming of the built-in ROM 18.

25 Claims, 15 Drawing Sheets

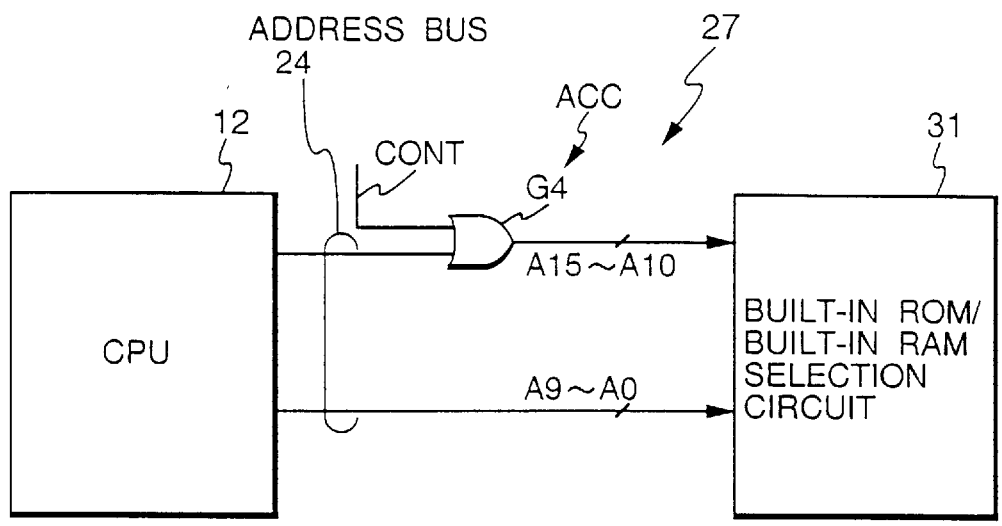
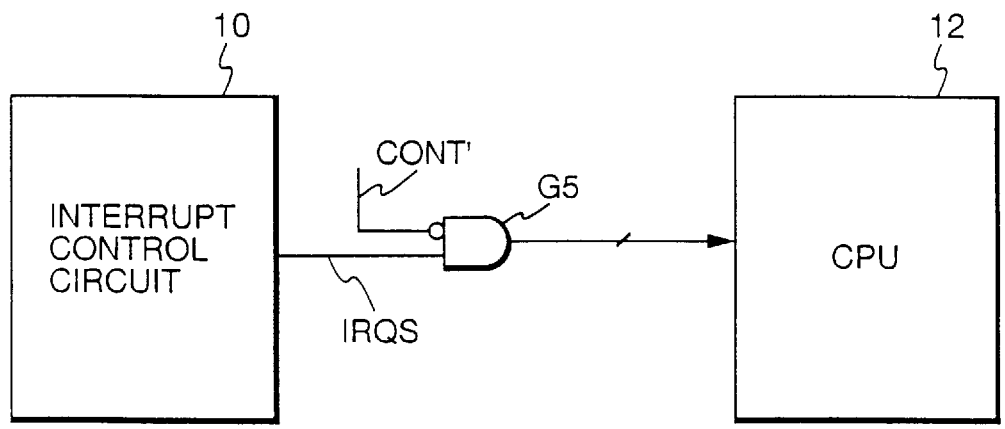

FIG. 16

WRITE

| MEMORY DEVICE | SELECTIVE/ NON-SELECTIVE | SOURCE | DRAIN | GATE |
|---|---|---|---|---|
| Q1 | SELECTIVE | 0v | 6v | 12v |
| Q2 | NON-SELECTIVE | 0v | 0v | 12v |
| Q3 | NON-SELECTIVE | 0v | 6v | 0v |
| Q4 | NON-SELECTIVE | 0v | 0v | 0v |

ERASE (POSITIVE VOLTAGE SYSTEM)

| MEMORY DEVICE | SELECTIVE/ NON-SELECTIVE | SOURCE | DRAIN | GATE |
|---|---|---|---|---|
| Q1,Q3 | SELECTIVE | 12v | 0v | 0v |
| Q2,Q4 | NON-SELECTIVE | 0v | 0v | 0v |

ERASE (NEGATIVE VOLTAGE SYSTEM)

| MEMORY DEVICE | SELECTIVE/ NON-SELECTIVE | SOURCE | DRAIN | GATE |
|---|---|---|---|---|
| Q1,Q2 | SELECTIVE | 5v | 0v | 10v |
| Q3,Q4 | NON-SELECTIVE | 5v | 0v | 0v |

FIG. 19

CONTROL REGISTER

PROGRAM / ERASE CONTROL REGISTER

| Vpp | | | | EV | PV | E | P |
|---|---|---|---|---|---|---|---|

↖ PEREG

ERASING BLOCK DESIGNATION REGISTER ⟵ MBREG1

| | 6 | 5 | 4 | 3 | 2 | 1 | 0 |
|---|---|---|---|---|---|---|---|

ERASING BLOCK DESIGNATION REGISTER ⟵ MBREG2

| 7 | 6 | 5 | 4 | 3 | 2 | 1 | 0 |
|---|---|---|---|---|---|---|---|

Vpp : Vpp APPLYING FLAG    E : ERASE
                           P : PROGRAM

EV : ERASE VERIFY
PV : PROGRAM VERIFY

MBREG1 : FOR DESIGNATION OF LARGE BLOCK
MBREG2 : FOR DESIGNATION OF SMALL BLOCK 5,881,295

DATA PROCESSOR WHICH CONTROLS INTERRUPTS DURING PROGRAMMING AND ERASING OF ON-CHIP ERASABLE AND PROGRAMMABLE NON-VOLATILE PROGRAM MEMORY

BACKGROUND OF THE INVENTION

The present invention relates to an on-board write art of a program memory built in a single-chip microcomputer serving as a data processor, particularly to an art to be effectively applied to a single-chip microcomputer provided with a flash-type electrically erasable and programmable read only memory (hereafter referred to as a flash-type EEPROM or a flash memory).

A single-chip microcomputer (also known as a microcomputer) serving as a data processor has a built-in program memory for storing an operation program. The single-chip microcomputer executes predetermined data processing specified in the operation program stored in the built-in program memory.

The program memory has been formed with a mask-type nonvolatile memory (hereafter referred to as a mask-type read-only memory or mask ROM) or an electrically programmable nonvolatile memory (hereafter referred to as an electrically programmable read-only memory or EPROM). In recent years, however, a flash-type electrically erasable and programmable read-only memory (hereafter referred to as a flash-type EEPROM or flash memory) has been applied to a program memory.

The flash memory allows written data to be electrically erased or electrically rewritten. Therefore, a microcomputer having a built-in flash memory as a program memory has the following advantages.

Cutover of a software program (application software) developed by a user generally tends to be delayed. Therefore, it is possible to assemble the hardware for a microcomputer-applied system before the cutover of a software program and then write a developed software program in a flash memory of a microcomputer. Thereby, it is possible to quickly ship the microcomputer-applied system.

Moreover, when specification-modified software or function-added software (upgraded software or version-up software) is developed for already shipped application system software, it is possible for a user to rewrite the shipped application system software to the above newly-developed software.

That is, in the case of a microcomputer having a built-in flash memory as a program memory, the microcomputer is assembled on a printed circuit board, mounting board, or system board and then, the processing for writing an operation program in the above flash memory can be performed. In this specification, the processing for programming data in a built-in flash memory after assembling a microcomputer having the built-in flash memory on a printed circuit board, mounting board, or system board is referred to as "on-board programming" and this programming mode is referred to as "on-board programming mode".

Several methods are available to the flash memory programming. These methods are roughly divided into the following two types.

(1) The first method is referred to as a user program mode or boot mode. This mode uses a method for branching the flow of program execution by a central processing unit (CPU) built in a microcomputer to the on-board programming and changing the data in a flash memory by the CPU.

(2) The second method is referred to as a programming mode using a ROM writer. This mode uses a method for changing the data in a flash memory by external means (ROM writer) by stopping a microcomputer.

Japanese Patent Laid-Open No. 180664/1994 discloses a system for handling trouble at the time of rewriting by moving a trouble handling program to another area when rewriting a flash memory.

SUMMARY OF THE INVENTION

In the case of the above first method, because the information stored in a built-in flash memory is subject to rewriting, programming control programs present in memories other than a flash memory such as a built-in RAM (random access memory) are executed by a central processing unit (CPU) to erase or program the data in the flash memory.

In the case of the above first method, original functions of a microcomputer are not lost under the erasing or programming state of the flash memory. Therefore, an interrupt to the central processing unit (CPU) erroneously occurs due to a signal input supplied from a unit outside of the microcomputer or an address error occurs while the programming control program is executed. Moreover, because an NMI (Non-Maskable Interrupt) cannot inhibit an interrupt, an unexpected NMI may occur while the data in the flash memory is programmed or erased according to the above first method. A similar state may occur if an interrupt other than the NMI is enabled.

In general, when an interrupt or address error occurs, the processing by a central processing unit is branched to an interrupt handling routine or exception handling routine. A vector address showing the head address of an interrupt handling routine or exception handling routine is used to branch the processing by the central processing unit to the interrupt handling routine or exception handling routine. When an interrupt occurs or exception handling occurs, the vector address of a relative interrupt or exception handling routine is obtained by the central processing unit. The obtained vector address is programmed in a program counter of the central processing unit and the program flow of the central processing unit jumps to an address indicated by the vector address to execute relative interrupt or exception handling.

It is clarified as the result of study by the present inventor that the following is a matter to be cautioned.

That is, a plurality of vector addresses are generally stored in the vector address storage area of a program memory. Even when a flash memory is used as a program memory, the same is applied to the above mentioned and thus, a plurality of vector addresses are stored in the vector address storage area of the flash memory.

However, if an interrupt occurs or exception handling occurs when a flash memory is used as a program memory and erasing or programming is executed for the flash memory in the user program mode or boot mode, a central processing unit cannot obtain a desired vector address stored in the vector address storage area of the flash memory.

That is, vector addresses are present in the program memory, though a rewrite control program for erasing or programming the data in the flash memory in the user program mode or boot mode is present in a memory (e.g. RAM) other than the flash memory. Therefore, no correct vector address can be obtained during erasing or programming for the flash memory serving as the program memory. As a result, it has been clarified that a microcomputer may run away or an application system may be damaged if an interrupt occurs or exception handling occurs in the user program mode or boot mode of a program memory. Moreover, if the microcomputer runs away and data is over-erased from or over-programmed in the flash memory, it may be impossible to reproduce the microcomputer-application system. It is in general a means to detect a trouble such as a power-supply voltage drop by an interrupt such as an NMI.

It is regarded that erasing or programming for the flash memory includes erasing verify operation and programming verify operation.

In the case of a microcomputer having a built-in flash memory as a program memory, a user can program software in the built-in flash memory after assembling the hardware of an application system or rewrite the software stored in the built-in flash memory of a shipped applied system. Therefore, there are a lot of advantages in setting a flash memory in a microcomputer. However, it is found that occurrence of an interrupt or occurrence of exception handling during on-board programming in the user program mode or boot mode of a built-in flash memory may cause a microcomputer to run away or an application system to be damaged.

It is an object of the present invention to improve the safety of a system during on-board programming of a program memory.

It is another object of the present invention to provide a data processor including an electrically erasable and programmable non-volatile memory as a program memory and capable of preventing a microcomputer from running away and from being damaged even when an interrupt handling or exception handling is requested during on-board programming of the above program memory.

It is still another object of the present invention to provide a microcomputer which includes a flash memory as a program memory and can respond to a request for an interrupt handling or exception handling made during on-board programming or erasing of the program memory.

It is still another object of the present invention to provide a single-chip microcomputer which includes a flash memory as a program memory and is constituted so as to be able to obtain a vector address related to the interrupt handling or exception handling to which a central processing unit responds, when a request for an interrupt handling or exception handling is made during on-board programming or erasing of the program memory.

The above and other objects and novel features of the present invention will become more apparent from the description and accompanying drawings of this specification.

The outline of a typical invention among those disclosed in this application is briefly described below.

A data processor comprises an electrically erasable or programmable program memory (18), a central processing unit (12) accessible to the program memory (18), and malfunction exclusion means for excluding a malfunction due to occurrence of an interrupt or occurrence of exception handling while the data in the program memory is erased or programmed.

The malfunction exclusion means can include the following structures.

(1) As shown in FIG. 6, a first control logic circuit (G5) for excluding or invalidating an interrupt request or an exception handling request to the central processing unit (12) while the data in the program memory (18) is erased or programmed is provided in the data processor.

Therefore, because the first control logic circuit (G5) excludes or invalidates the interrupt request or exception handling request to the central processing unit (12) while the data in the program memory (18) is erased or programmed in the user program mode or boot mode, the central processing unit (12) does not execute the operation for obtaining a vector address corresponding to the interrupt request or exception handling request while the data in the program memory (18) is erased or programmed. This improves the safety of a system during on-board programming of the program memory (18). Thereby, it is possible to inhibit an unintended interrupt request from occurring.

(2) As shown in FIG. 7, a second control logic circuit (G6) for stopping erasing or programming of the data in the program memory (18) in response to an interrupt request or exception handling request to the central processing unit (12) while the data in the program memory (18) is erased or programmed in the user program mode or boot mode is provided in the data processor.

That is, while the data in the program memory (18) is erased or programmed, the second control logic circuit (G6) responds to an interrupt request or exception handling request to the central processing unit (12) and stops erasing or programming of the data in the program memory (18). Specifically, the second control logic circuit (G6) changes the data in the control bits such as an erasing control bit (32), a programming control bit (33), and a verifying control bit (34) of an operation control register set to the program memory (18) from active state to inactive state.

Therefore, when an interrupt request or exception handling request to the central processing unit (12) occurs while the data in the program memory (18) is erased or programmed, the second control logic circuit (G6) stops erasing or programming of the data in the program memory (18). Occurrence of the above interrupt may be caused by a programming error of a programming and erasing control program or an emergency such as an outage. Therefore, by stopping erasing or programming of the data in the program memory (18), over-erasing or over-programming of data in a flash memory can be prevented. Moreover, thereafter, the central processing unit (12) can obtain a vector address corresponding to the interrupt request or exception handling request from the program memory (18). Thus, improvement of the safety of the system during on-board programming of the program memory (18) is achieved.

(3) As shown in FIGS. 3 and 5, selected memory change means (G1, G2, and G4) for changing a memory selecting operation from the program memory (18) to another memory are provided in the data processor so that a predetermined area of a memory other than the program memory (18) such as a random access memory (13) can be accessed by inhibiting access to the vector address storage area of the program memory (18) when an interrupt request or exception handling request to the central processing unit (12) occurs while the data in the program memory (18) is erased or programmed. Moreover, the selected memory change means (G1, G2, and G4) can be set to a bus controller (27).

In this case, vector address data for interrupt handling or exception handling to be processed when an interrupt request or exception handling request to the central processing unit (12) occurs while the data in the program memory (18) is erased or programmed is previously stored in a predetermined area of a memory other than the program memory (18). Moreover, the vector address data stored in the predetermined storage area is set so as to indicate the head address of a predetermined interrupt handling routine or exception handling routine stored in another storage area of the memory other than the program memory (18).

(3.1) In the above Item (3), when an interrupt request or exception handling request to the central processing unit (12) occurs while the data in the program memory (18) is erased or programmed, the selected memory change means (G1 and G2) responds to detection of the access to the vector address storage area of the program memory (18) and deactivates a selection signal of the program memory (18). Instead, the selected memory change means (G1 and G2) activate a selection signal of the memory (13) other than the program memory (18).

(3.2) In the above Item (3), when an interrupt request or exception handling request to the central processing unit (12) occurs while the data in the program memory (18) is erased or programmed, the selected memory change means (G4) responds to detection of the access to the vector address storage area of the program memory (18) and converts an address signal for accessing the vector address storage area of the program memory (18) into an address signal for accessing a predetermined storage area of a memory such as the random access memory (13) other than the program memory (18).

According to the structure shown in the above Item (3.1) or (3.2), the central processing unit (12) can obtain a vector address related to a relative interrupt handling routine or exception handling routine by accessing another area of the memory other than the program memory (18) even if an interrupt request or exception handling request to the central processing unit (12) occurs while the data in the program memory (18) is erased or programmed in the user program mode or boot mode. Therefore, over-erasing or over-programming of data in a flash memory can be prevented by using an NMI and thereby, notifying a microcomputer of an emergency such as drop of power supply voltage Vcc due to an outage and stopping erasing or programming of the data in the program memory (18). In this case, it is possible to protect a flash memory from an abnormal state such as over-erasing, over-programming, or intermediate state by executing the processing for recording a stop state of erasing or programming in an interrupt handling routine to an NMI. This achieves the improvement of the safety of a system during on-board programming of the program memory (18).

BRIEF DESCRIPTION OF THE DRAWINGS

FIG. 5 shows an address conversion circuit ACC serving as malfunction exclusion means set to the bus control circuit 27 in FIG. 1;

FIG. 6 shows the bus controller 27 including a gate G5 for ignoring all interrupts including an NMI (Non-Maskable Interrupt) during erasing or programming of data in a flash memory serving as the built-in ROM 18;

FIG. 16 shows a voltage condition for erasing and programming data in a memory cell of the flash memory 18;

FIG. 19 shows a control register of the flash memory 18.

DESCRIPTION OF THE PREFERRED EMBODIMENTS

Figure 1:
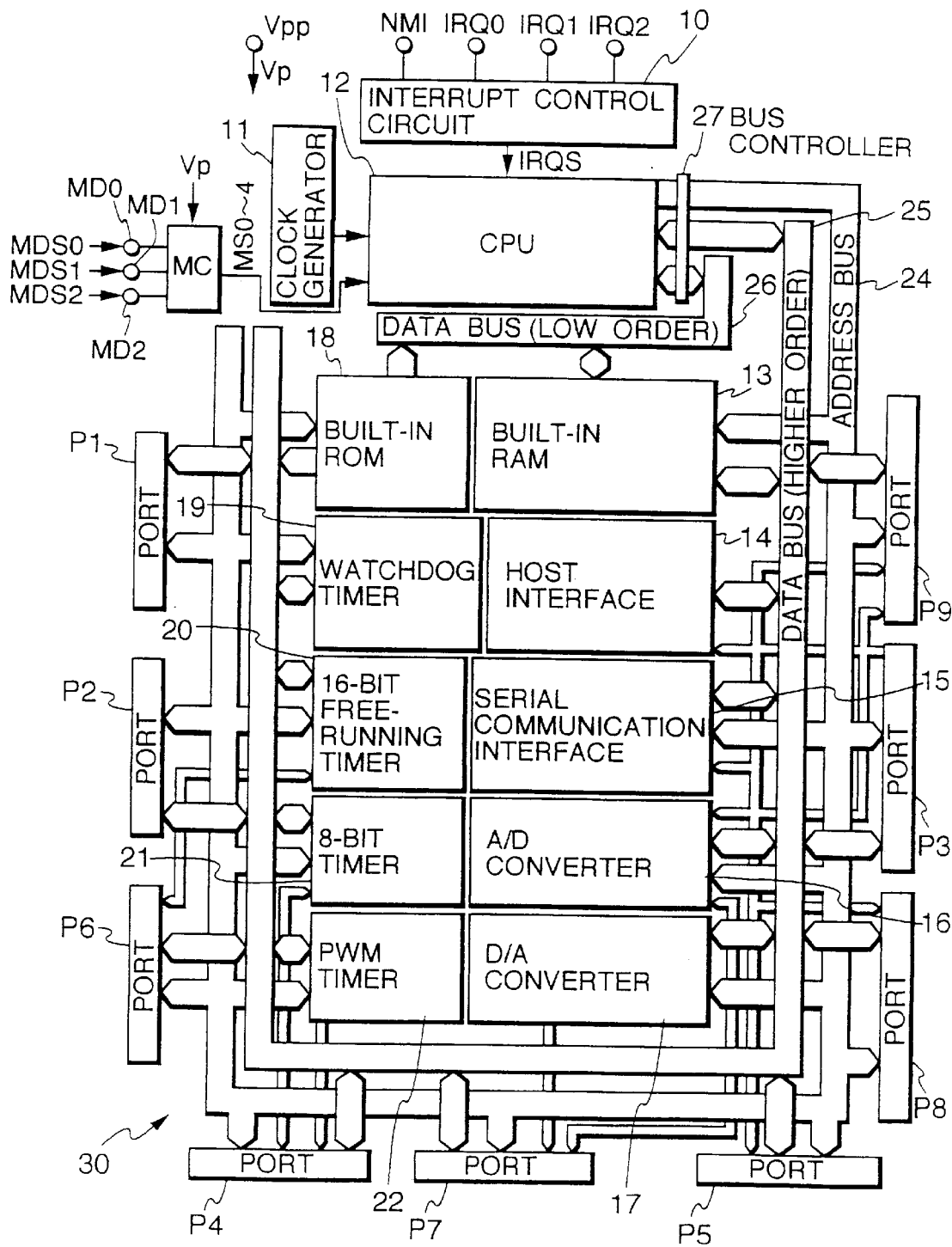
FIG. 1 is a block diagram showing the whole structure of the single-chip microcomputer of an embodiment of the present invention.

FIG. 1 shows the single-chip microcomputer 30 serving as the data processor of the present invention. Though not restricted, the single-chip microcomputer 30 is formed on a semiconductor substrate (semiconductor chip) such as a single-crystal silicon substrate.

As shown in FIG. 1, the single-chip microcomputer 30, though not restricted, comprises an interrupt control circuit 10, a clock generation circuit 11, the central processing unit (CPU) 12, the built-in random access memory (RAM), internal RAM or on-chip RAM 13, a host interface circuit 14, a serial communication interface circuit 15 serving as a serial communication circuit, a 10-bit analog-to-digital conversion circuit (A-D converter) 16, an 8-bit digital-to-analog conversion circuit (D-A converter) 17, the built-in read-only memory (ROM),internal ROM or on-chip ROM 18 serving as a program memory, a watchdog timer circuit 19, a 16-bit free-running timer circuit 20, an 8-bit timer circuit 21, a PWM timer circuit 22 used for pulse width modulation, and ports P1 to P9 used for inputting and outputting a plurality of signals or inputting/outputting a plurality of signals.

These circuit modules (10, 12 to 22, and P1 to P9) are connected by an address bus 24 and a data bus 26 so that the central processing unit 12 can access the circuit modules (12 to 22 and P1 to P9) by using the address bus 24 and data buses 25 and 26.

When the central processing unit 12 accesses any one of the circuit modules (12 to 22 and P1 to P9), it outputs an address signal for selecting the address assigned to a circuit module to be accessed to the address bus 24. In this case, when the data read mode is set, the circuit module to be accessed outputs data to the data buses 25 and 26 and the central processing unit 12 captures the data through the data bus 26. However, when the data write mode is set, the central processing unit 12 outputs desired data to the data buses 25 and 26 and the circuit module to be accessed captures the data through the data buses 25 and 26.

Then, functions of the circuit blocks (10 to 22) are described below.

The clock generator 11, though not restricted, comprises an oscillator for oscillating by using a crystal oscillator, a duty correction circuit for correcting the duty of pulses output from the oscillator, a clock divider for generating built-in peripheral-module clock signals for the built-in peripheral modules (12 to 22) by dividing a system clock signal output from the duty correction circuit, and a prescaler for generating an internal clock signal by dividing the built-in peripheral-module clock signal output from the clock divider. The circuit modules (10 and 12 to 22) are operated synchronously with a system clock with a predetermined frequency generated by the clock generator 11.

The CPU 12, though not restricted, comprises an instruction register (IR) for storing a defined instruction in a program to be processed, an instruction decoder (IDEC) for decoding an instruction stored in the instruction register, and an instruction executing section (IEXE) whose operation is controlled in accordance with a control signal output from the instruction decoder. The instruction executing section (IEXE) comprises an arithmetic and logic unit (ALU) for executing arithmetic operations and logic operations, 8-bits$_{13}$16 general-purpose registers (R0 to R15), and a program counter (PC) for storing data related to the instruction address of an instruction to be next executed in a program. The data in the program counter (PC) is incremented whenever an instruction is executed by the instruction executing section (IEXE). The instruction executing section (IEXE) performs predetermined types of processing and controls operations of the built-in peripheral modules (12 to 22) by using a system clock output from the clock generator 11 as a time base. The instruction register (IR), instruction decoder (IDEC), instruction executing section (IEXE), arithmetic and logic unit (ALU), general-purpose registers (R0 to R15), and program counter (PC) are not illustrated in FIG. 1 in order to simplify the drawing.

One of the general-purpose registers is used as a stack pointer when an interrupt or exception occurs. That is, when the interrupt or exception occurs, the data stored in the general-purpose register at the point of that time is saved in, for example, a predetermined external memory. In this case, the stack point stores address data showing the address of the saved data. At the time of returning from interrupt handling or exception handling, the data in the general-purpose register which is saved in the external memory is recovered into the general-purpose register by using the address data stored in the stack pointer when the interrupt handling or exception handling is accepted. Moreover, when one unit from one leading edge to the next leading edge of the system clock is assumed as one state, a memory cycle or bus cycle of the CPU 12 comprises, for example, two or three states. In other words, the CPU 12 is designed so as to be able to access the built-in peripheral modules (12 to 22) at two or three periods of the system clock.

The built-in RAM 13, though not restricted, uses a static RAM having a storage capacity of 1K bytes. The built-in RAM 13 is connected to the CPU 12 by the address bus 24 and the data buses 25 and 26 respectively having an 8-bit width. As a result, the built-in RAM 13 makes it possible to input and output byte data (8-bit data) and word data (16-bit data) at one two-state memory access cycle.

The host interface circuit 14 has a parallel interface function of two channels of the CPU 12 and a host system and, though not restricted, comprises a 4-byte data register, a high-speed gate logic, and an interrupt request circuit. The circuit 14 can communicate with the host system through five control signals from the host system, four output signals to the host system, and the data bus 25 with an 8-bit width serving as a command or data input/output bus.

The serial communication interface circuit 15 is a module for performing serial data communication with other LSI and makes it possible to select between the communication in a start-stop synchronous mode and the communication in a clock synchronous mode. The circuit 15 allows designation of an operation mode, designation of a data format, and setting of a bit rate, and includes a plurality of control registers for transmission/reception control, a transmission/reception control circuit, and a bus interface.

The A-D converter 16, though not restricted, is used to convert an input analog signal into a digital signal according to the sequential conversion system and, though not restricted, makes it possible to select analog inputs of up to 8 channels.

The D-A converter 17 has a function for converting a digital signal input through the data bus 25 into an analog signal and includes various registers, an 8-bit D-A converting section, and a control circuit.

The watchdog timer 19 monitors a system. When values of a timer counter in the watchdog timer 19 overflow without being rewritten due to runaway of a system, the timer 19 outputs a reset signal or an NMI (Non-Maskable Interrupt) request to the CPU 12. When this function is not used, the timer counter in the watchdog time 19 can also be used as an interval timer.

The 16-bit free-running timer 20, though not restricted, can generate two types of independent waveform outputs by basing on the 16-bit free-running counter and moreover, makes it possible to measure the width of an input pulse and the period of an external clock.

The 8-bit timer 21 is provided with two channels and moreover, provided with an 8-bit time constant register in addition to a timer counter for each channel. Thereby, the timer 21 can output a pulse signal with any duty ratio.

The PWM timer 22 is provided with two channels and with an 8-bit timer counter and an 8-bit duty register for each channel, and makes it possible to obtain a duty pulse of 0 to 100% according to a value set to the 8-bit duty register.

The interrupt control circuit 10 has a function for receiving an NMI (Non-maskable Interrupt) and IRQ0, IRQ1, and IRQ2 which serve as external interrupt request signals and not-illustrated internal interrupt requests supplied from the peripheral modules 15 to 22 and performing types of processing in accordance with a predetermined priority sequence so that an interrupt and exception handling request signal IRQS is transmitted to the CPU 12 in accordance with the interrupt request handling result. The interrupt control circuit 10, though not illustrated in FIG. 1, is connected to the address bus 24 and the data bus 25 so that an internal register can be accessed by the CPU 12. Moreover, the NMI (Non-Maskable Interrupt) is regarded as an interrupt which cannot be masked. Therefore, when the interrupt control circuit 10 receives the NMI (Non-Maskable Interrupt), it executes the interrupt handling according to the NMI.

The built-in ROM 18 is referred to as a program memory for storing a program to be executed by the CPU 12. The built-in ROM 18, though not restricted, is connected to the CPU 12 by the address bus 24 and the data buses 25 and 26 respectively having an 8-bit width. As a result, the built-in ROM 18 can output byte data (8-bit data) and word data (16-bit data) at one two-state memory access cycle. As described above, the built-in ROM 18 comprises a flash-type electrically erasable and programmable read-only memory (hereafter referred to as a flash-type EEPROM or flash memory). A program stored in the flash memory as data can be programmed by setting a single-chip microcomputer to the on-board programming mode.

When the operation mode of the microcomputer 30 of this embodiment is set to the on-board programming mode, it is possible to program, erase, and verify a program (data) in the built-in ROM 18. The on-board programming mode includes two types of operation modes (boot mode and user program mode). The boot mode is referred to as a first on-board programming mode and the user program mode is referred to as a second on-board programming mode.

The operation mode of the microcomputer 30 is discriminated by a mode setting circuit MC and the mode setting circuit MC sets one of mode setting signals MS0 to MS4 to high level. The high-level mode setting signal showing a designated operation mode is supplied to, for example, circuits of the central processing unit CPU 12 and the bus controller 27. The mode setting circuit MC judges whether signal voltages of mode signals MDS0 to MDS2 supplied to mode setting terminals MD0 to MD2 and a high voltage Vp supplied to a high-voltage supply terminal Vpp are combined as predetermined and sets the operation mode of the microcomputer 30 to a desired operation mode. Thereby, the operation mode of the microcomputer 30 includes not only the boot mode and the user program mode but also the PROM mode, single chip mode, and external memory extension mode to be mentioned later. The single chip mode is a mode for constituting a microcomputer system by using address spaces of a built-in RAM and a built-in ROM. The external memory extension mode is a mode for constituting a microcomputer system by using not only the address spaces of the built-in RAM and ROM but also those of other memories.

For example, when a voltage of 12 V is supplied to the mode setting terminal MD2 and the high-voltage supply terminal Vpp, the operation of the microcomputer 30 is set to the boot mode. That is, the mode setting signal MS0 is set to high level. In this case, a voltage of 0 or 5 V is supplied to the mode setting terminals MD1 and MD0 respectively in accordance with the address-space setting mode of the microcomputer 30. When a voltage of 12 V is supplied to the high-voltage supply terminal Vpp, the operation mode of the microcomputer 30 is set to the user program mode. That is, the mode setting signal MS1 is set to high level. In this case, a voltage of 0 or 5 V is supplied to the mode setting terminals MD0 to MD2 respectively in accordance with the address-space setting mode of the microcomputer 30. Though not restricted, the high level of the mode setting signal MS2 shows the above PROM mode, the high level of the mode setting signal MS3 shows the above single chip mode, and the high level of the mode setting signal MS4 shows the above external memory extension mode.

To use the boot mode, the programming and erasing user program (rewrite control program) of the flash memory 18 and programming data are previously prepared in a not-illustrated host system. When the boot mode is set, the boot program previously programmed in a boot ROM is started after resetting is canceled. Then, the low-level period of data transmitted from the host system is measured by the serial communication interface circuit 15, thereby the bit rate of the data transmitted from the host system is calculated, and the value of the bit rate register of the serial communication interface circuit 15 is determined. Then, the host system transfers the data constituting the rewrite control program. The data for the rewrite control program received by the serial communication interface circuit 15 is stored in the built-in RAM 13. After programming of the rewrite control program is completed, the processing of the boot program is branched to the head address of the rewrite control program of the built-in RAM 13. Thereby, the rewrite control program programmed in the built-in RAM 13 is executed by the CPU 12 and programming or erasing of the data in the flash memory 18 is executed. The above boot ROM comprises a nonvolatile memory circuit such as a mask ROM and the data stored in the ROM is not erased even if the power supply potential lowers.

In the user program mode, programming or erasing of the data in the flash memory 18 can be made by the programming and erasing user program (rewrite control program) of the flash memory 18. In this case, high-voltage supply means for supplying a high voltage and data supply means for supplying rewrite data are provided on a mounting board. Then, the rewrite control program is stored in the flash memory 18 or a part of the program area of other memory (external memory). The CPU 12 stores the rewrite control program in the built-in RAM 13 in response to setting of the user program mode and on-board rewriting of the flash memory is performed by the CPU 12 for executing the rewrite control program.

It is possible to prepare not only the on-board programming mode but also the PROM mode as the erasing or programming mode of the flash memory 18 serving as a built-in ROM. The PROM mode is a mode for making it possible to program the program data in the flash memory 18 by using a general-purpose PROM writer. The PROM mode is set by, for example, supplying the mode setting signals MDS0 to MDS2 at the low level "0" to all of the mode setting terminals MD0 to MD2.

If an interrupt request or exception handling request occurs during erasing or programming of the data in the flash memory 18 in the user program mode or boot mode when a vector address is present in the flash memory 18 serving as a built-in ROM, the CPU 12 cannot obtain a correct vector address. This is because the data in the built-in ROM 18 is being erased or programmed and thereby, the CPU 12 cannot access the vector address storage area of the flash memory 18. Thus, a microcomputer may run away as described above.

Therefore, this embodiment is constituted so that a part of the storage area (address area) of the built-in RAM 13 is moved to the vector address storage area of the flash memory 18 while the data in the flash memory 18 is erased or programmed in the user program mode or boot mode. That is, the address of the vector address storage area of the flash memory 18 is moved to the address of a part of the storage area of the built-in RAM 13 while the data in the flash memory 18 is erased or programmed. Thereby, an address signal for fetching a vector address generated during erasing or programming of the data in the flash memory 18 accesses a part of the storage area of the built-in RAM 13. Therefore, it is possible to prevent a microcomputer from running away by previously storing necessary addresses in a part of the storage area of the built-in RAM 13 so that a correct vector can be obtained. In other words, the built-in RAM 13 of this embodiment is used to substitute for the vector address storage area stored in the flash memory 18 while the data in the built-in ROM 18 is erased or programmed in the user program mode or boot mode. In this case, available addresses are previously programmed in a part of the storage area of the built-in RAM 13 and thereafter, execution of a program for erasing or programming data in the built-in ROM 18 is started.

Figure 2:
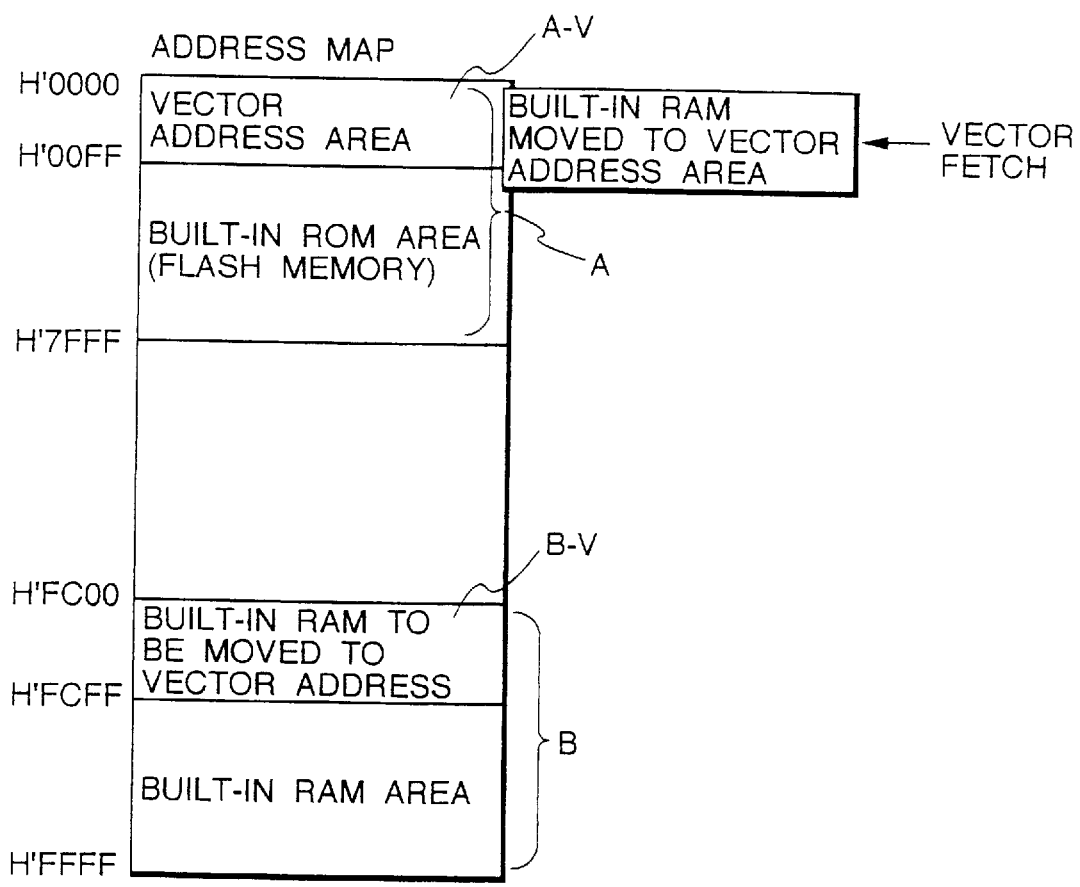
FIG. 2 is an illustration for explaining an address map when moving part of a built-in RAM included in the above microcomputer to a vector address area.

FIG. 2 shows the first embodiment of the address map according to the present invention including the vector address storage area B-V of the built-in RAM 13 used to erase or program the data in a flash memory serving as the built-in ROM 18.

An address space controlled by the CPU 12, in other words, an address space which can be accessed by the CPU 12, though not restricted, has 64K bytes (H'0000 to H'FFFF). That is, the address bus 24 has 16 bits.

The address area A of an address space assigned to the built-in ROM 18 has 32K bytes (H'0000 to H'7FFF). In the address area A, the vector address storage area A-V for storing address data related to a vector address has 256 bytes (H'0000 to H'00FF).

An address area B of the address space assigned to the built-in RAM 13 has 1K bytes (H'FC00 to H'FFFF). The address area B includes the address area B-V as shown in FIG. 2. The address area B-V serves as an area for substituting for the vector address storage area A-V in order to safely perform on-board programming of the built-in ROM 18 and, for example, 256 bytes (H'FC00 to H'FCFF) are assigned to the area B-V. Therefore, the vector address storage area B-V stores one or more vector addresses used when an interrupt request or exception handling request occurs in the on-board programming mode (user program mode) of the built-in ROM 18.

Even if the CPU 12 reads the vector address area A-V when the CPU 12 handles an interrupt request generated during erasing or programming of the data in the flash memory 18 in the user program mode or boot mode, the vector address storage area B-V is accessed because the addresses (H'FC00 to H'FCFF) assigned to the vector address storage area B-V are apparently moved to the vector address storage area A-V as described above. Thereby, a correct vector address is obtained from the vector address storage area B-V during erasing or programming of data in a flash memory serving as the built-in ROM 18. Therefore, the CPU 12 can correctly perform desired interrupt handling and exception handling correspondingly to an interrupt request and exception handling request even during erasing or programming of the data in the flash memory 18.

To realize the substitution for the above vector address area, it is necessary that the vector address storage area B-V of the built-in RAM 13 is accessed by the bus controller 27 so that the contents of the area B-V (predetermined vector address data) are read when a vector address signal is output from the CPU 12.

That is, when the CPU 12 generates an address signal for reading the vector address storage area A-V of the flash memory 18 at the time of interrupt handling during erasing or programming of data in a flash memory serving as the built-in ROM 18 in the user program mode or boot mode, it is necessary for the bus controller 27 to control a module selection signal as shown below. That is, the bus controller 27 deactivates a module selection signal of the built-in ROM 18, which should originally be activated and instead, activates a module selection signal of the built-in RAM 13 and performs control so that the vector address storage area B-V of the built-in RAM 13 is read. Specifically, it is necessary to set the control circuits (G1, G2, and G3) shown in FIG. 3 to the bus controller 27 shown in FIG. 1.

Figure 3:
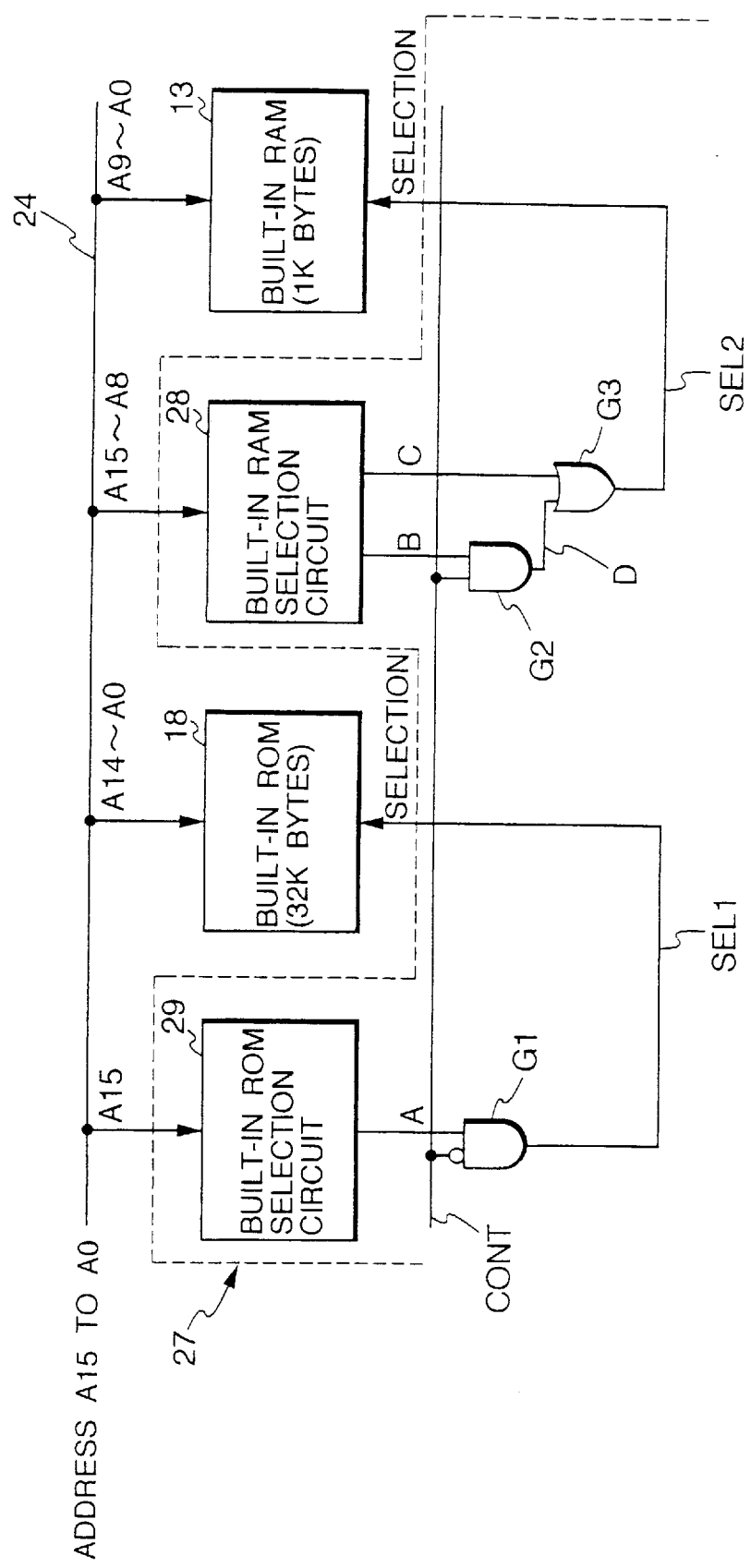
FIG. 3 is an illustration showing the structure of the main portion of the bus controller 27 in terms of the relation between the built-in ROM 18 and the built-in RAM 13 when address-converting a vector address storage area B-V of the built-in RAM 13 into a vector address storage area A-V of the flash memory 18.

FIG. 3 shows a structure of main portion of the bus controller 27 when address-converting the vector address storage area B-V of the built-in RAM 13 into the vector address storage area A-V of the flash memory 18 in terms of the relation between the built-in ROM 18 and the built-in RAM 13.

The bus controller 27 includes a built-in ROM 29 for selecting the built-in ROM 18, a built-in RAM selection circuit 28, and gates G1 to G3 serving as control logic circuits (malfunction exclusion means). The built-in ROM selection circuit 29 outputs an output signal A at the high level "1" when an address signal showing the address of the built-in ROM 18 is present on the address bus 24. The built-in RAM selection circuit 28 outputs an output signal B at the high level "1" when an address signal showing the vector address storage area A-V of the built-in ROM 18 is present on the address bus 24 and an output signal C at the high level "1" when an address signal showing the address of the built-in RAM 13 is present on the address bus 24. The gate G1 ANDs the inversion signal of the control signal CONT to be set to high level during erasing or programming of the data in the built-in ROM 18 in the user program mode or boot mode and under vector fetch with the output signal A and asserts a selection signal SEL1 serving as a module selection signal of the built-in ROM 18 from the low level "0" to the high level "1" when the built-in ROM 18 should be selected. The gate G2 ANDs the control signal CONT with the output signal B and outputs an output signal D at the high level "1" when these signals are set to the high level "1". The gate G3 receives the output signals C and D and asserts a selection signal SEL2 serving as a module selection signal of the built-in RAM 18 from the low level "0" to the high level "1" when the output signal C or D is set to the high level "1".

Addresses A14 to A0 (15 bits) are input to the built-in ROM 18 so that the built-in ROM (32K bytes) 18 can be accessed and addresses A9 to A0 (10 bits) are input to the built-in RAM 13 from the CPU so that the built-in RAM (1K bytes) can be accessed.

The built-in ROM selection circuit 29 receives an address A15 (only one bit) from the CPU 12 through the address bus 24. The output signal A is set to high level when the address A15 is low-level, that is, when addresses A15 to A0 output from the CPU 12 are set to "0xxx xxxx xxxx xxxx" (0 represents low level and x represents logic indetermination) and "0" or "1" is acceptable. That is, when an address signal for accessing the built-in ROM 18 is output onto the address bus 24, the output signal A becomes high-level.

The built-in RAM selection circuit 28 receives the addresses A15 to A8 from the CPU 12 through the address bus 24. When the addresses A15 to A0 output from the CPU 12 are set to "0000 0000 xxxx xxxx", the output signal B becomes high-level. That is, the output signal B is set to high level when an address signal for accessing the vector address storage area A-V of the built-in ROM 18 is output onto the address bus 24.

However, when the address signal is output onto the address bus 24 and the addresses A15 to A10 output from the CPU 12 are set to "1111 1100 xxxx xxxx", the output signal C becomes high-level. That is, the output signal C is set to high level when an address signal for accessing the built-in RAM 13 is output onto the address bus 24.

A high voltage is supplied to the built-in ROM 18 through a predetermined external terminal Vpp for erasing or programming. When the supplied high voltage is detected and a signal showing the vector fetch state is asserted by the CPU 12, the control signal CONT becomes high-level. That is, while the data in the built-in ROM 18 is erased or programmed and under vector fetch, the control signal CONT becomes high-level. The control signal CONT can be generated by a logic circuit constituted so as to be able to judge whether a high voltage is supplied through the predetermined external terminal Vpp and whether the CPU 12 is under the vector fetch state.

The gate G1 for obtaining the AND logic between the output signal A of the built-in ROM selection circuit 29 and the control signal CONT is arranged at the rear stage of the built-in ROM selection circuit 29 so that the built-in ROM 18 is selected when the selection signal SEL1 output from the gate G1 is set to high level. Moreover, the gate G2 for obtaining the AND logic between the output signal B of the built-in RAM selection circuit 28 and the control signal CONT and the gate G3 for obtaining the OR logic between the output logic of the gate G2 and the output signal C of the built-in RAM selection circuit 28 are used so that the built-in RAM 13 is selected when the selection signal SEL2 output from the gate G3 is set to high level. Therefore, when the addresses H'FC00 to H'FCFF are accessed, the selection signal SEL1 is set to low level and thereby, selection of the built-in ROM 18 is inhibited but instead, the selection signal SEL2 is set to high level and thereby the built-in RAM 13 is selected. That is, a vector address on the built-in ROM 18 is read while the data in the built-in ROM 18 is erased or programmed.

Moreover, in this case, it is assumed that the addresses A9 to A0 for designating the vector address storage area A-V of the built-in ROM 18 coincide with the addresses A9 to A0 of the vector address storage area B-V of the built-in RAM 13. Therefore, if the addresses A9 to A0 for designating the vector address storage area A-V of the built-in ROM 18 do not coincide with the addresses A9 to A0 of the vector address storage area B-V of the built-in RAM 13, it is necessary to design an address conversion circuit so that the address conversion function of the address conversion circuit operates when the output signal D is set to high level by setting the address conversion circuit between the address bus 24 and the built-in RAM 13. This type of the address conversion circuit frees the arrangement of the vector address storage area B-V of the built-in RAN 13 on the address space.

Then, another embodiment of the present invention is described below.

Figure 4:
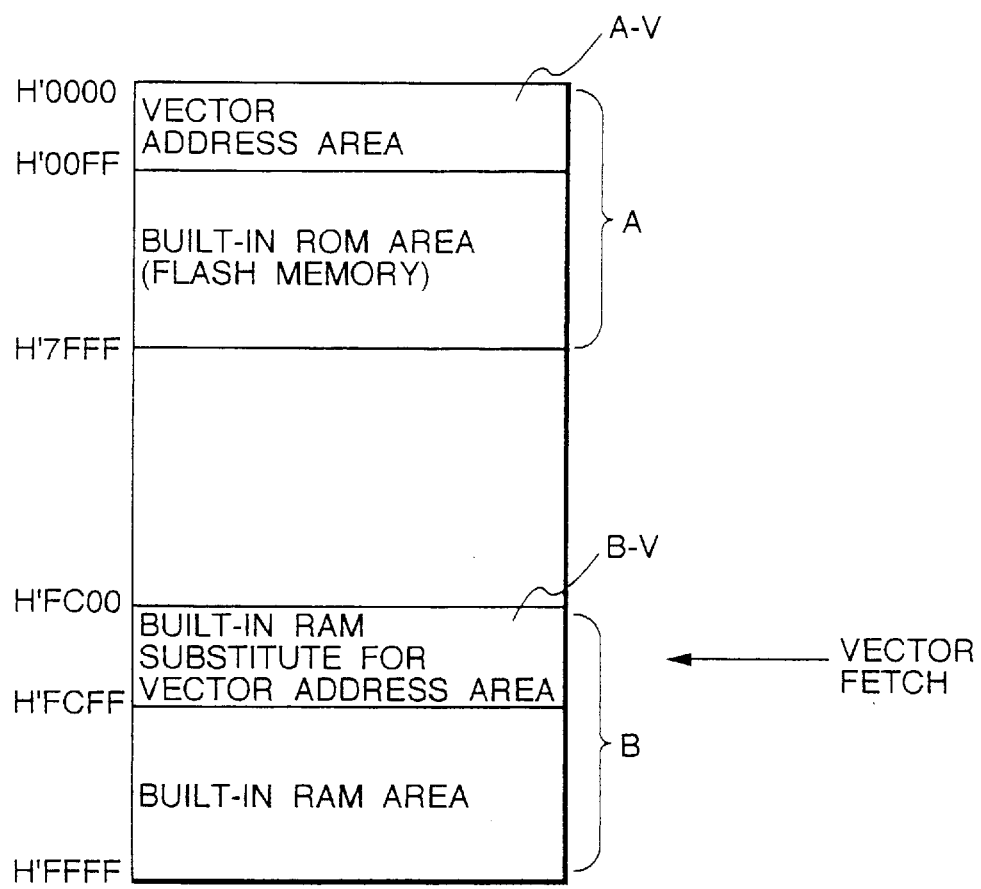
FIG. 4 is an illustration for explaining an address map of another embodiment of the present invention.

FIG. 4 shows the address map of this embodiment.

As shown in FIG. 4, this embodiment is constituted so as to move a vector address area to a built-in RAM area while the data in the built-in ROM 18 is erased or programmed in the user program mode or boot mode.

That is, the vector address area is moved not to the original vector address storage area A-V (H'0000 to H'00FF) of the built-in ROM 18 but to the vector address storage area B-V (H'FC00 to H'FCFF) of the built-in RAM while the data in the flash memory 18 is erased or programmed in the user program mode or boot mode. In this case, data for one or more available vector addresses is previously programmed in the built-in RAM 13 in response to erasing or programming of the data in the flash memory and thereafter, erasing or programming of the data in the flash memory 18 is started.

That is, an address signal for accessing the vector address storage area A-V of the built-in ROM 18 is converted into an address signal for accessing the vector address storage area B-V of the built-in RAM. Therefore, it is necessary to use an address conversion circuit for converting the address signal for accessing the vector address storage area A-V into the address signal for accessing the vector address storage area B-V when the address signal for accessing the vector address storage area A-V of the built-in ROM 18 is output from the CPU 12.

FIG. 5 shows an address conversion circuit ACC serving as malfunction exclusion means set to the bus control circuit 27 in FIG. 1.

The address conversion circuit ACC can be realized by a plurality of control logic circuits (gate circuits) G4 for ORing the address signals A15 to A10 output from the CPU 12 with the control signal CONT, and a built-in ROM/built-in RAM selection circuit 31 for selecting the built-in ROM 18 or the built-in RAM 13 in accordance with output address signals of the gate circuits G4 and the addresses A9 to A0 output from the CPU 12. The gates G4 and the built-in ROM/built-in RAM selection circuit 31 are built in the bus controller 27 shown in FIG. 1. Though only one gate G4 is shown in FIG. 5, six gates G4 are actually used correspondingly to the addresses A15 to A10. Moreover, the built-in ROM/built-in RAM selection circuit 31 includes the built-in ROM selection circuit 29 and the built-in RAM selection circuit 28 in FIG. 4, and the output signal A in FIG. 4 serves as the module selection signal SEL1 and the output signal C in FIG. 4 serves as the module selection signal SEL2.

In the above structure, when the address signal for accessing the vector address storage area A-V "0000 0000 xxxx xxxx" is output to the address bus 24 from the CPU 12, the signal is converted into the address signal "1111 1100 xxxx xxxx" for accessing the vector address storage area B-V and input to the built-in ROM/built-in RAM selection signal 31. Because the vector address storage area B-V of the built-in RAM 13 is thereby selected, vector fetch by the CPU 12 is applied to the vector address storage area B-V of the built-in RAM 13 while the data in the built-in ROM 18 is erased or programmed. Moreover, in FIG. 5, the vector address storage area A-V is made to serve as a 256-byte storage area starting with "0000 0000 0000 0000" and the vector address storage area B-V is made to start with "1111 1100 0000 0000". Therefore, it will easily be understood that the start address of the area B-V in which the address signals A10 and A9 are set to "0" should properly be changed when it is different from the above.

Thus, because the vector fetch performed while the data in the built-in ROM 18 is erased or programmed in the user program mode or boot mode is applied not to the vector address storage area A-V of the built-in ROM 18 but to the vector address storage area B-V of the built-in RAM 13, a correct vector address can be obtained from the vector address storage area B-V of the built-in RAM 13 even if an interrupt request or exception handling request occurs while the data in the flash memory serving as the built-in ROM 18 is erased or programmed similarly to the case of the previous embodiment (FIGS. 2 to 3). Therefore, it is possible to prevent a microcomputer from running away and improve the safety of a system at the time of on-board programming of a program memory. Moreover, in the case of this embodiment, it is unnecessary to switch between the access to the built-in RAM 13 and the access to the built-in ROM 18 depending on vector address fetch or not.

Moreover, even by ignoring all interrupt requests including a NMI (Non-Maskable Interrupt), it is possible to improve the safety of the system at the time of on-board programming of the program memory.

FIG. 6 shows the bus controller 27 including the gate G5 for ignoring all interrupts including an NMI (Non-Maskable Interrupt) while the data in the flash memory serving as the built-in ROM 18 is erased or programmed.

As shown in FIG. 6, the bus controller 27 includes the control logic circuit (gate circuit) G5 serving as malfunction exclusion means between the interrupt control circuit 10 and the CPU 12. The gate G5 receives the control signal CONT' to be set to high level while the data in the flash memory 18 is erased or programmed and it is controlled to active state in response to the high-level control signal CONT'. However, when the control signal CONT' is low-level, the gate G5 is controlled to inactive state.

Even when the interrupt and exception handling request signal IRQS output from the interrupt circuit 10 is asserted to high level, the asserted state of the signal IRQS is not transferred to the CPU 12 if the control signal CONT' showing the erasing or programming state of the flash memory 18 is asserted to high level. Therefore, any malfunction related to vector fetch operation does not occur because the CPU 12 does not execute the vector fetch operation when the flash memory 18 is under the erasing or programming state.

In this case, however, because an NMI is an effective means for notifying the microcomputer of an emergency such as an outage, it should be noted that a case in which erasing or programming of the data in the flash memory 18 fails due to a hardware-involved cause such as an outage cannot be recovered if the NMI is neglected.

Figure 7:
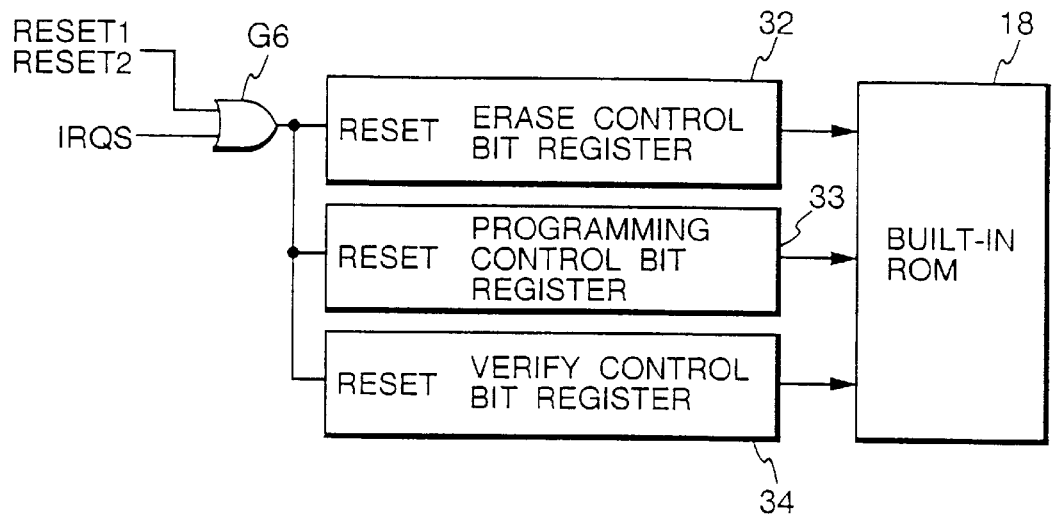
FIG. 7 shows the control logic circuit G6 serving as malfunction exclusion means for resetting the erasing control bit register, programming control bit register, and verifying control bit register of the built-in ROM 18 when a programming request occurs during erasing, programming, or verifying of the data in the built-in ROM 18.

FIG. 7 shows the control logic circuit G6 serving as malfunction exclusion means for resetting the erasing control bit register, programming control bit register, or verifying control bit of the built-in ROM 18 when an interrupt request occurs while the data in the built-in ROM 18 is erase, programmed, or verified in the user program mode or boot mode.

As shown in FIG. 7, the data in the built-in ROM 18 can be erased, programmed, or verified by setting a control bit to the erasing control bit register 32, programming control bit register 33, or verifying control bit register 34. Therefore, it is also possible to form the structure so that the erasing control bit register 32, programming control bit register 33, or verifying control bit register 34 is reset when the interrupt and exception handling request IRQS output from the interrupt control circuit 10 is asserted. The erasing control bit register 32, programming control bit register 33, and verifying control bit register 34 must correspond to an external reset request RESET1 and a reset request RESET2 from the watchdog timer 19. Therefore, the gate G6 is used which ORs the reset requests RESET1 and RESET2 on one hand with the interrupt and exception handling request signal IRQS on the other. An output signal of the gate G6 is supplied to the reset terminal of the erasing control bit register 32, programming control bit register 33, or verifying control bit register 34. According to the above structure, erasing, programming, or verifying of the data in the built-in ROM 18 is stopped because the erasing control bit register 32, programming control bit register 33, or verifying control bit register 34 is reset if a programming request occurs while the data in the built-in ROM 18 is erased, programmed, or verified. Thereby, it is possible to prevent the microcomputer from running away and improve the safety of a system at the time of on-board programming of a program memory.

Figure 8:
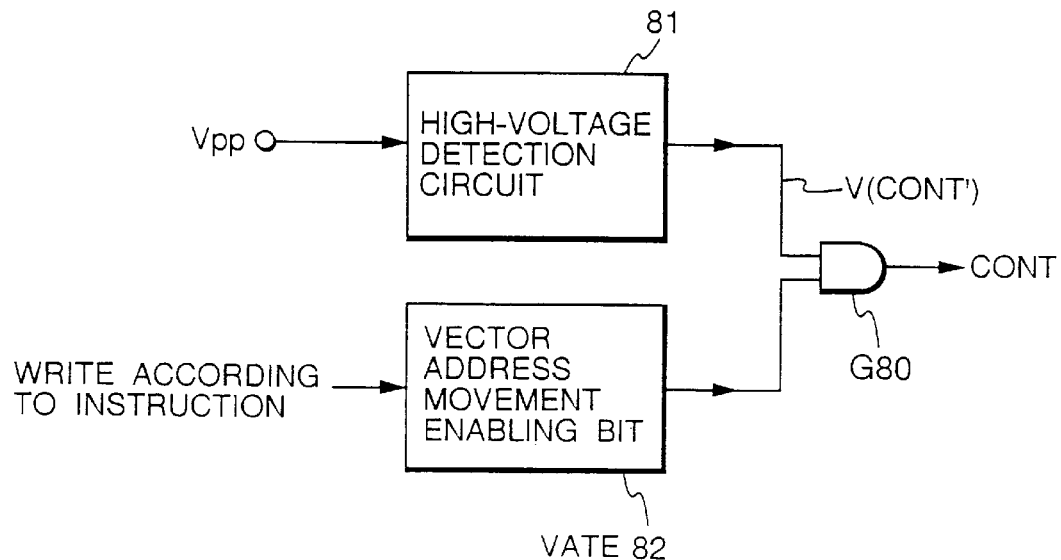
FIG. 8 shows a circuit for generating a control signal CONT explained in FIG. 3 and a control signal CONT' explained in FIG. 5.

FIG. 8 shows a circuit for generating the control signal CONT described in FIG. 3 and the control signal CONT' described in FIG. 5.

As shown in FIG. 8, a high-voltage detection circuit 81 is connected to the external terminal Vpp to which a high voltage such as 12 V is applied while the data in the flash memory 18 is programmed or erased and the circuit 81 outputs a high-level output signal V in response to the supply of the high voltage of 12 V. The high-level output signal V can be used as, for example, the control signal CONT' in FIG. 5. Moreover, an enabling bit VATE 82 for controlling whether to enable movement of a vector address storage area is set to the microcomputer 30. The CPU 12 executes a predetermined instruction (instruction for setting the enabling bit VATE 82) in response to the setting of the programming mode (user program mode) or boot mode of the flash memory 18. Thereby, the enabling bit VATE 82 is set. An AND gate 80 is a gate circuit for ANDing the output signal V with the output state of the enabling bit VATE 82 and an output signal of the gate G80 serves as the control signal CONT in FIG. 3. The above structure makes it possible to generate the control signal CONT in FIG. 3 and the control signal CONT' in FIG. 5.

Figure 9:
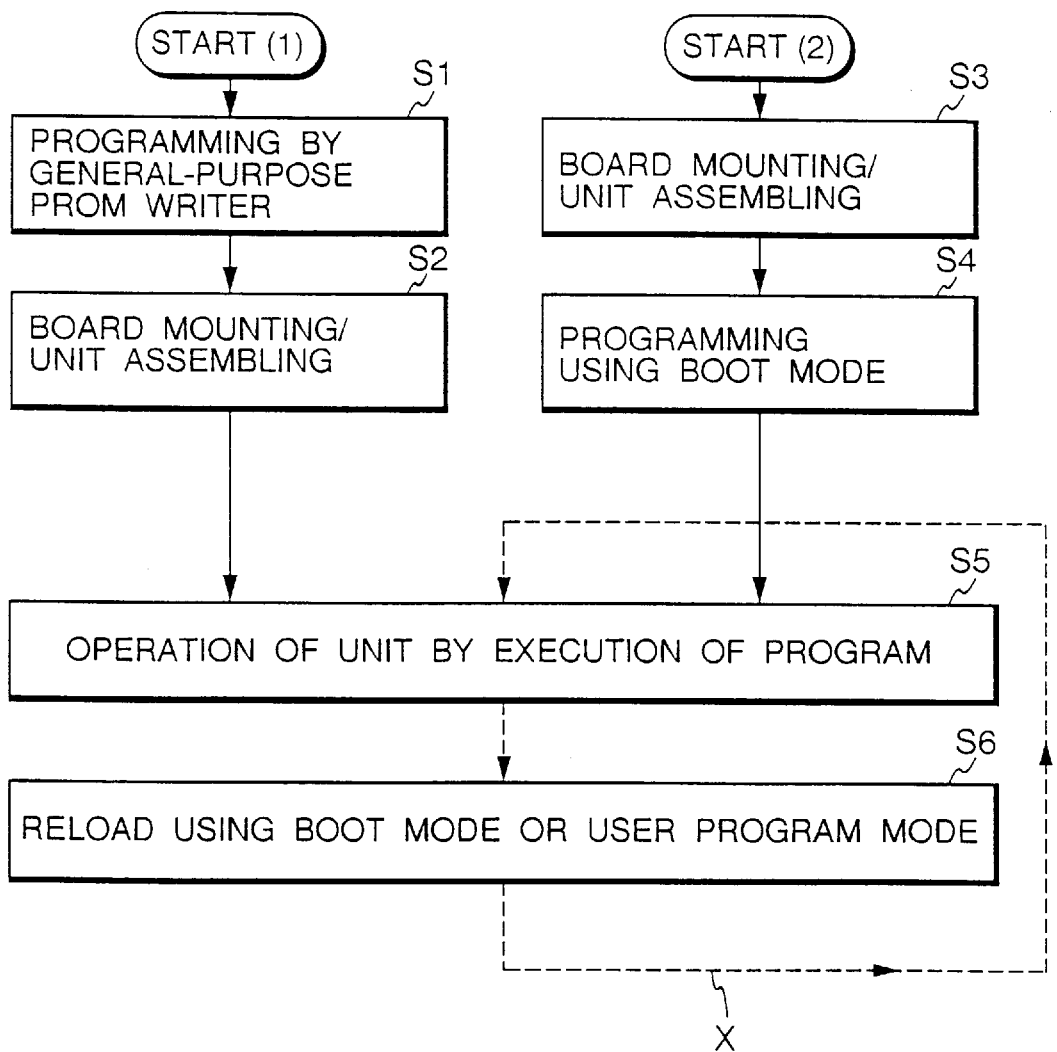
FIG. 9 shows the programming method of the flash memory 18 of the microcomputer 30 in FIG. 1 in terms of the relation between the PROM mode and the on-board programming mode described above.

FIG. 9 shows the programming method of the flash memory 18 of the microcomputer 30 in terms of the relation between the PROM mode and the on-board programming mode which are described above.

As shown in FIG. 9, the programming method includes the programming of the flash memory 18 according to the PROM mode and the programming of the flash memory 18 according to the on-board programming mode. Start (1) shows the start of the programming of the flash memory 18 according to the PROM mode, in which the operation mode of the microcomputer 30 is set to the PROM mode by the above described method and desired program data is programmed in the flash memory 18 by a general-purpose ROM writer (step S1). Thereafter, the microcomputer 30 in which the desired program data is programmed is mounted on a board such as a printed circuit board and a microcomputer-applied system is assembled by using the mounting board (step S2).

Moreover, Start (2) shows the start of the programming of the flash memory 18 according to on-board programming mode, in which the microcomputer 30 in which no desired program data is programmed is mounted on a board such as a printed circuit board and a microcomputer-applied system is assembled by using the mounting board (step S3). Thereafter, the operation mode of the microcomputer 30 is set to the boot mode by the above-described method and desired program data is programmed in the flash memory 18 in accordance with a boot program (step S4). Thus, even if cutover of a software program (application software) developed by a user is delayed, it is possible to assemble the hardware of a microcomputer-applied system before the cutover of the software program and then, program the developed software program in a flash memory of a microcomputer. Thereby, it is possible to quickly ship the microcomputer-applied system.

After steps S2 and S4, the microcomputer-applied system executes system operations in accordance with the desired program data programmed in the flash memory 18 (step S5).

In this case, when specification-modified software or function-added software (upgraded or version-up software) is developed for the software of already shipped microcomputer-applied system, it may be necessary for a user to reload the software of the already shipped application system to the above newly-developed software (case 1). Moreover, it may be necessary for a user of the microcomputer-applied system to change the keyboard function from, for example, English mode to French mode (case 2). When the case 1 or 2 occurs, it is necessary to reload the data in the flash memory 18 to desired program data.

Therefore, as shown in step S6, the operation mode of the microcomputer 30 is set to the boot mode or user program mode. For example, because it may be necessary to entirely reload the program for the above case 1, the operation mode of the microcomputer 30 is set to the boot mode and the program data in the flash memory 18 is reloaded to desired program data. However, because it is enough to reload only part of the program data for the above case 2, the operation mode of the microcomputer 30 is set to the user program mode and part of the program data in the flash memory 18 is reloaded to desired data.

After step S6, step 5 is restarted and the microcomputer-applied system executes system operations in accordance with the reloaded program as shown by a broken line X.

Steps S5 and S6 are repeated according to necessity.

Figure 10:
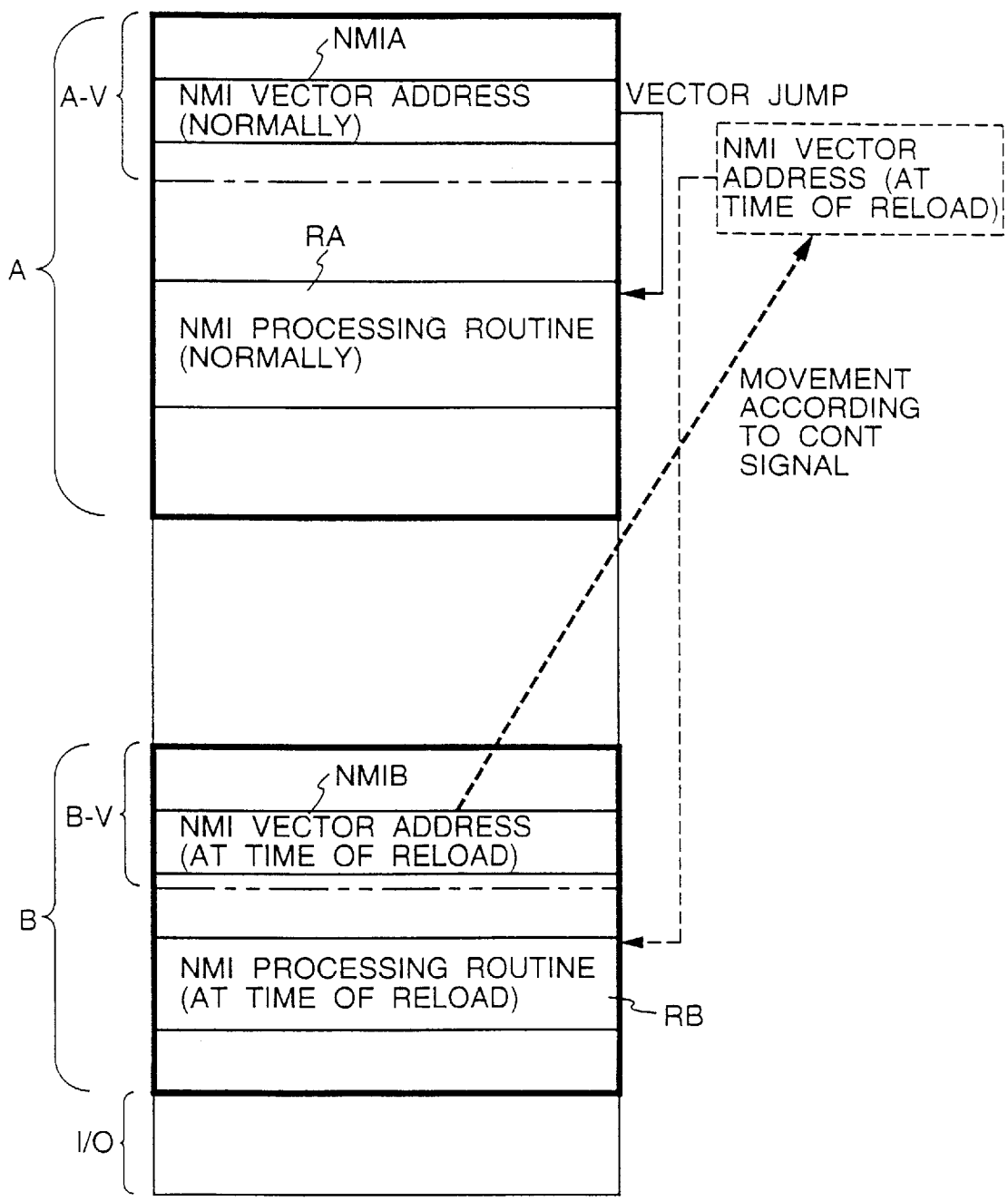
FIG. 10 shows a further detailed address map of the present invention, in which areas for storing a vector address of an NMI (Non-Maskable Interrupt) and an NMI handling routine for the vector address in the normal mode (single-chip mode or external memory expansion mode) and the on-board loading mode of a flash memory are shown.

FIG. 10 shows a further detailed address map of the present invention, in which the vector address of an NMI (Non-Maskable Interrupt) and the NMI handling routine storage area corresponding to the address are shown in the user program mode or boot mode in the normal mode (single chip mode or external memory extension mode) and the user program mode or boot mode in the on-board reloaded mode of the flash memory. FIG. 10 can also be used as a specific example of the address maps shown in FIGS. 2 and 4.

As shown in FIG. 10, a vector address NMIA of the NMI (Non-Maskable Interrupt) is stored in the vector address storage area A-V of the flash memory 18 and an NMI handling routine RA corresponding to the vector address NMIA is stored in a part of the address space A of the flash memory 18 in the normal mode such as the single chip mode or external memory extension mode. That is, the vector address NMIA shows the head address of the NMI handling routine RA. Therefore, when an NMI (Non-Maskable Interrupt) occurs in the normal mode, the CPU 12 obtains the vector address NMIA of the NMI by vector fetch operation and jumps to the address shown by the vector address NMIA, that is, the head address of the NMI handling routine RA to execute the processing.

Moreover, at the time of on-board reloading of the data in the flash memory 18 in the user program mode or boot mode, the vector address NMIB of the NMI (Non-Maskable Interrupt) is stored in the vector address storage area B-V of the built-in RAM 13 and the NMI handling routine RB corresponding to the vector address NMIB is stored in a part of the address space B of the built-in RAM 13. That is, the vector address NMIB shows the head address of the NMI handling routine RB. At the time of reloading of the data in the flash memory 18 in the user program mode or boot mode, if an NMI (Non-Maskable Interrupt) occurs, the CPU 12 obtains the vector address NMIB of the NMI (Non-Maskable Interrupt) by vector fetch operation and vector-jumps to the address shown by the vector address NMIB, that is, the head address of the NMI handling routine RB to execute the processing.

Therefore, the NMI (Non-Maskable Interrupt) at the time of on-board reloading of the data in the flash memory 18 in the user program mode or boot mode is executed by using the vector address NMIA or NMI handling routine RA stored in the built-in RAM 13 instead of using the vector address NMIB or NMI handling routine RA stored in the flash memory 18. Therefore, the NMI (Non-Maskable Interrupt) is securely executed at the time of on-board reloading of the data in the flash memory 18 in the user program mode or boot mode. In this case, attention must be paid to the fact that use of the vector address storage area B-V of the built-in RAM 13 or an area for storing the NMI handling routine RB or the like is limited as a work area for reloading.

The methods shown in FIGS. 3 to 5 can be used to move the vector address storage areas A-V and B-V and the addresses of the vector address storage areas A-V and B-V are moved in accordance with the control signals CONT and CONT'.

Figure 11:
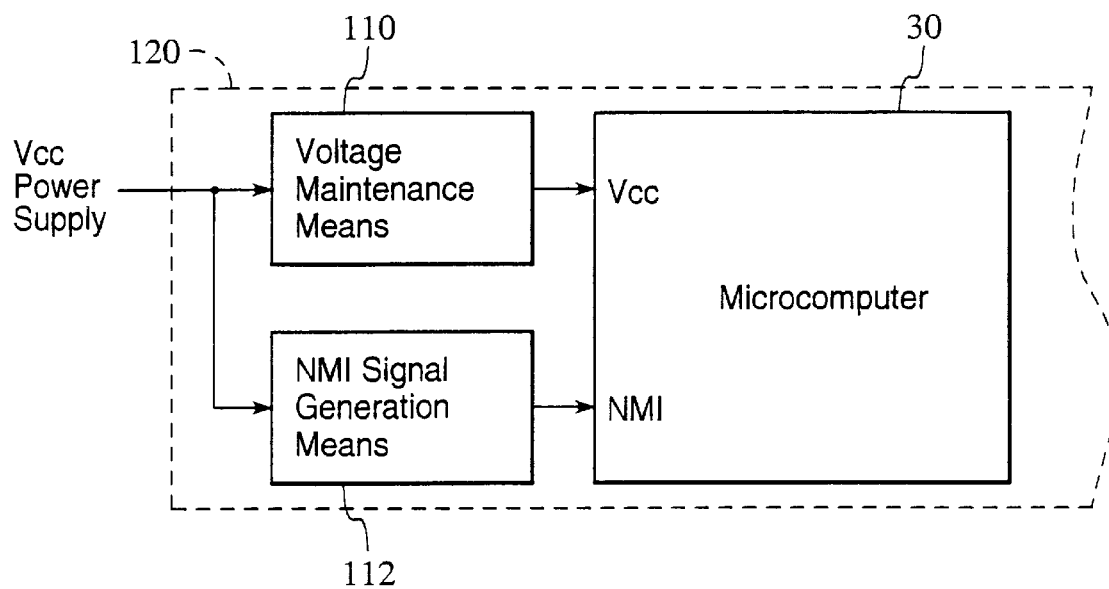
FIG. 11 shows an illustration for explaining the usage of an NMI (Non-Maskable Interrupt) in the on-board programming mode and a circuit for generating the NMI.

FIG. 11 shows an illustration for explaining the usage of an NMI (Non-Maskable Interrupt) and its forming circuit at the time of on-board reloading in the user program mode or boot mode.

The microcomputer 30 of the present invention is assembled on a printed circuit board 120 together with a voltage maintenance means 110 and NMI signal generation means 112.

The voltage maintenance means 110 includes a function for maintaining the voltage of the Vcc terminal at 4.5 V or higher for a certain time (e.g. approx. 1 ms) when the voltage of the Vcc power supply (normally, 5 V) lowers to a specified value or less such as 4.5 V or lower. Moreover, the microcomputer 30 sets a mode prepared to prevent the internal state from being damaged due to runaway of the microcomputer 30 such as a software standby mode for stopping generation of system clocks. For this purpose, the voltage maintenance means 110 is formed by using, for example, a large-capacity capacitor. Even if the voltage of the Vcc power supply further lowers, the voltage maintenance means 110 maintains the potential of the power supply terminal Vcc of the microcomputer 30 at a voltage (e.g.2.0 V) with which the microcomputer 30 can maintain the software standby mode. For this purpose, the voltage maintenance means 110 is constituted by including, for example, a secondary battery.

When the voltage of the Vcc power supply (normally, 5 V) lowers to a specified value or less such as 4.5 V or lower, the NMI signal generation means 112 detects the voltage and generates an NMI. The NMI signal generation means 112 generates a trailing edge changing from 5 to 0 V at the NMI signal input terminal of the microcomputer 30 to assert the NMI.

When the voltage of the Vcc power supply (normally, 5 V) lowers to a specified value or less at the time of on-board reloading of the flash memory 18 (in the user program mode or boot mode), the on-board reloading of the flash memory 18 cannot be performed. Therefore, as shown above, it is detected that the voltage of the Vcc power supply (normally, 5 V) lowers to a specified value or less, an NMI is generated, reloading of the data in the flash memory 18 is interrupted, and the NMI handling routine is executed by the CPU 12. In this case, when the NMI is accepted by the CPU 12, the contents of the general-purpose registers (R0 to R15) and the program counter (PC) of the CPU 12, though not restricted, are stacked in an external memory.

Therefore, there is an advantage that the contents of the general-purpose registers (R0 to R15) and program counter (PC) can be returned to the NMI accepted state in accordance with the value of the above stack pointer (SP) when returning from the NMI handling routine RB. Moreover, there is an advantage that an external memory for storing the contents of the general purpose registers (R0 to R15) and the program counter (PC) is accessed in accordance with the value of the stack pointer (PC) and the reloading state of the flash memory 18 can be analyzed in accordance with the contents.

Figure 12:
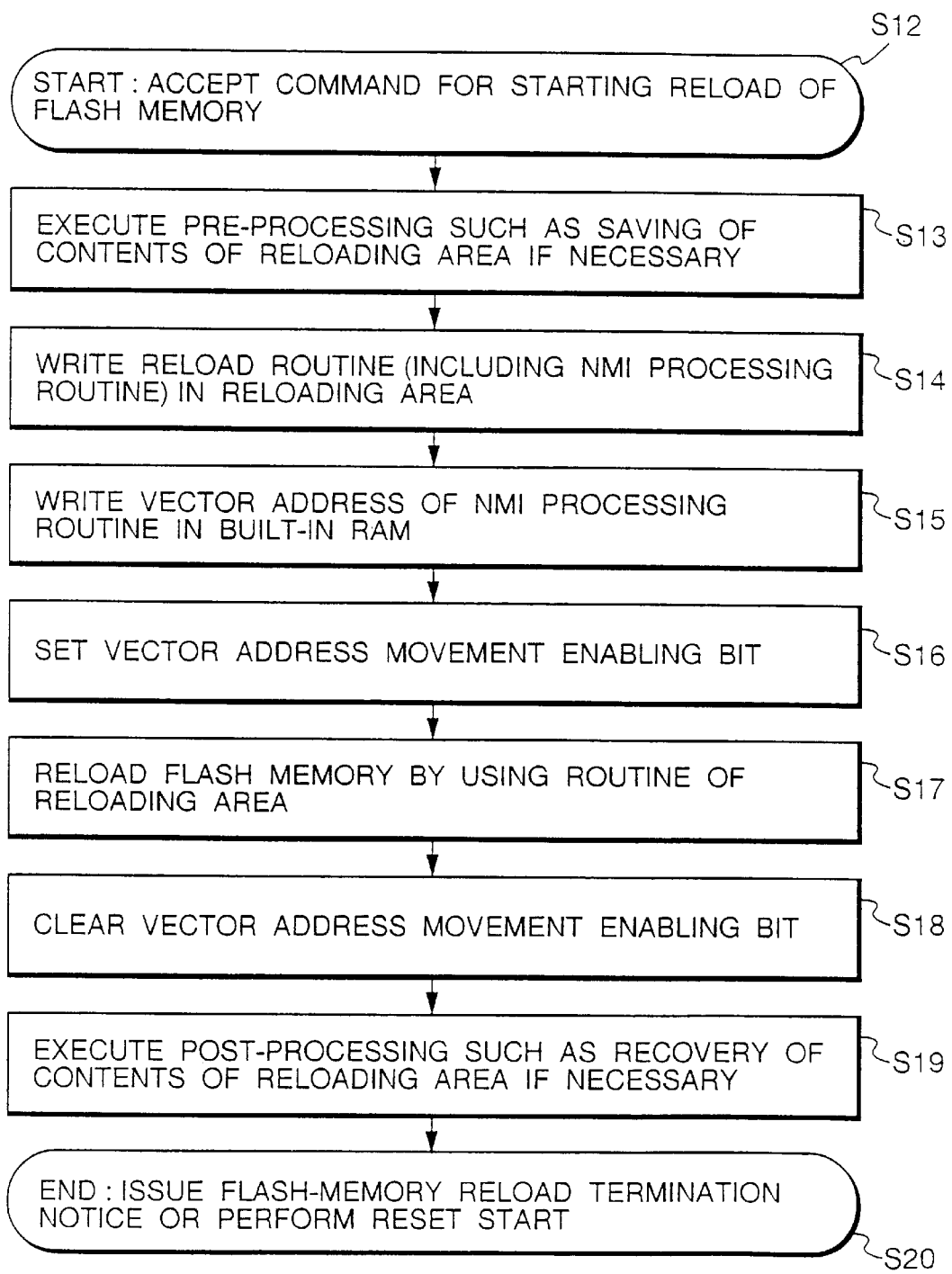
FIG. 12 shows a reloading flow to be executed between the start and the end of the on-board programming mode (example of the user program mode) of the flash memory 18.

FIG. 12 shows a flow of reloading executed between start and end of the on-board reloading mode of the flash memory 18 (example of user program mode).

As shown in FIG. 12, a command for starting the reloading of the data in the flash memory 18 is first issued to the CPU 12. The CPU 12 executes preprocessing such as saving of the contents of an address area serving as a reloading work area if necessary (step S13).

The reloading area can also use a part of the address area of the built-in RAM 18 or a part of the address area of an external RAM in the external memory extension mode.

In the next step S14, a reloading routine is programmed in the reloading area by, for example, the CPU 12. The reloading routine includes a programming control program and the NMI handling routine RB. Moreover, the reloading routine may be stored in the flash memory 18 or supplied to the microcomputer 30 from an external unit.

Then, the vector address NMIB corresponding to the NMI handling routine RB is programmed in the vector address storage area B-V of the built-in RAM 13 by, for example, the CPU 12 (step S15). Then, as shown in FIG. 8, the CPU 12 sets a vector address movement enabling bit VATE 82 (step S16). The above preprocessing is executed.

Thereafter, in step S17, the CPU 12 executes the reloading routine programmed in the reloading work area to reload the program in the flash memory 18. Program data to be programmed in the flash memory 18 is supplied from a unit outside of the microcomputer 30. After reloading is completed (step S17), the following postprocessing is executed by the CPU 12.

That is, the vector address movement enabling bit VATE 82 set in step S16 is reset (step S18). In other words, the enabling bit VATE 82 is cleared. Thereafter, the CPU 12 executes postprocessing such as recovering or saving of the contents of the reloading work area if necessary (step S19). That is, when the contents are saved in step S13, the contents are recovered in step S19.

Then, in step S20, notice or reset-start of termination of reloading of the data in the flash memory 18 is executed and the reloading of the data in the flash memory 18 is completed.

Then, concrete structure of the flash memory 18 is described below.

Figure 13:
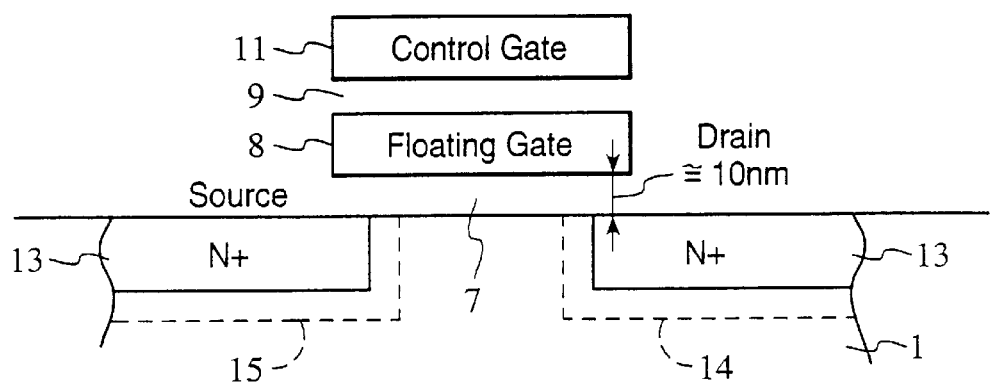
FIG. 13 shows a cross section of a memory cell of the flash memory 18.
Figure 14:
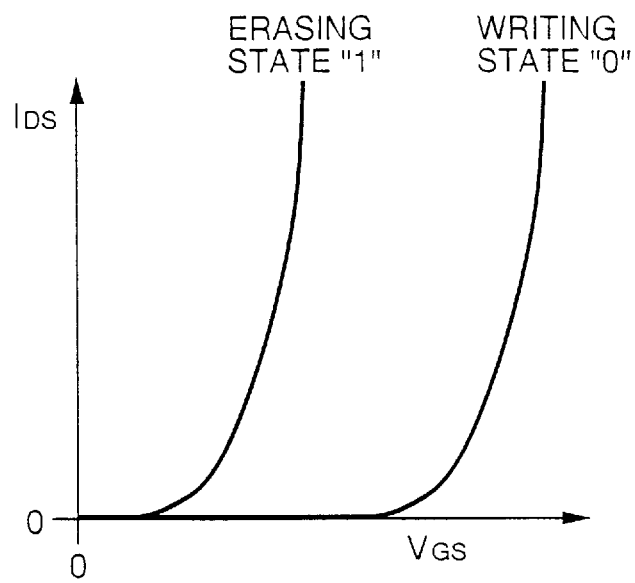
FIG. 14 shows thresholds of the erasing state and the programming state of a memory cell of the flash memory 18.

FIGS. 13 and 14 show the principle of a memory cell of the flash memory 18. The memory cell illustrated in FIG. 13 comprises an insulated-gate field-effect transistor having a two-layer gate structure. In FIG. 13, symbol 1 represents a P-type silicon substrate, 14 represents a P-type semiconductor region formed on the silicon substrate 1, 13 represents an N-type semiconductor region, and 15 represents a low-concentration N-type semiconductor region. Symbol 8 represents a floating gate formed on the P-type silicon substrate 1 through a thin oxide film 7 (with a thickness of, for example, 10 nm) serving as a tunnel insulating film and 11 represents a control gate formed on the floating gate 8 through an oxide film 9. A source comprises symbols 13 and 15 and a drain comprises symbols 13 and 14. Information stored in this memory cell is substantially held by the transistor as a change of a threshold voltage. A case is described below in which a transistor for storing information (hereafter referred to as a storage transistor) is the N-channel type in a memory cell unless otherwise specified.

Programming of information in a memory cell is realized by applying a high voltage to, for example, the control gate 11 and the drain and injecting electrons into the floating gate 8 from the drain side by means of avalanche injection. As the result of this programming, the threshold voltage of the storage transistor viewed from the controlling gate 11 becomes higher than that of the erased-state storage transistor in which programming is not performed as shown in FIG. 14.

Erasing of information in the memory cell is realized by applying a high voltage to, for example, the source and extracting electrons from the floating gate 8 to the source side by tunneling. As shown in FIG. 14, the threshold voltage of the storage transistor viewed from the control gate 11 is lowered due to erasing. In FIG. 14, the threshold of the storage transistor is set to a positive voltage level under any of the programming and the erasing states. That is, the threshold voltage under the programming state is raised and the threshold voltage under the erasing state is lowered compared to a word line selection level supplied to the control gate 11 from a word line. Because the both threshold voltages and the word line selection level have the above relation, it is possible to constitute a memory cell with one transistor without using a selective transistor. Stored information is electrically erased by extracting electrons accumulated in the floating gate 8 to a source electrode. Therefore, when erasing is continued for a comparatively long time, electrons are extracted which are more than electrons injected into the floating gate at the time of programming. Therefore, when over-erasing in which electrical erasing is continued for a comparatively long time is performed, a trouble occurs that a word line is selected even at a word-line non-selective level because the threshold voltage of the storage transistor becomes a negative level. However, it is also possible to perform programming by using tunnel current similarly to the case of erasing.

In reading, a voltage to be applied to the drain and the control gate 11 is limited to a comparatively low value so that weak programming is not performed for the above memory cell, that is, undesirable carrier injection is not performed for the floating gate 8. For example, when a low voltage of approx. 1 V is applied to the drain 13 and 14, a low voltage of approx. 5 V is applied to the control gate 11. By detecting the level of the channel current flowing through the storage transistor, it is possible to decide "0" or "1" of the information stored in the memory cell.

Figure 15:
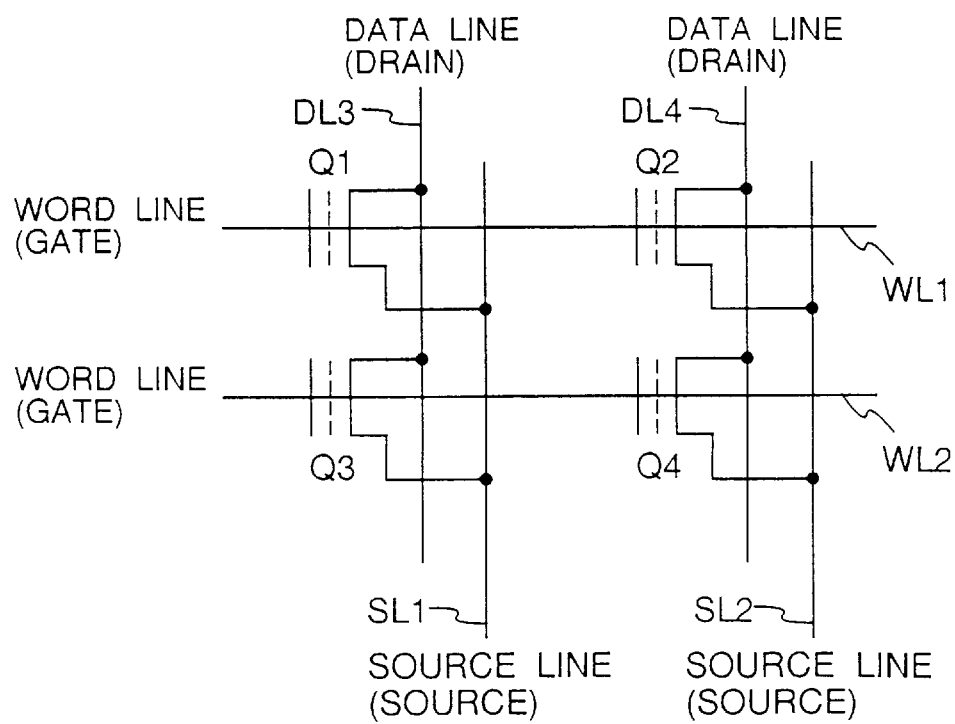
FIG. 15 shows the structure of a memory array of the flash memory 18.

FIG. 15 shows the structural principle of a memory array using the above storage transistor. In FIG. 15, four storage transistors (memory cells) Q1 to Q4 are typically shown. In the case of the memory cells arranged like a matrix in X and Y directions, control gates (selective gates of memory cells) of the storage transistors Q1 and Q2 (Q3 and Q4) in the same row are respectively connected to a corresponding word line WL1 (WL2) and the drain regions (input/output nodes of memory cells) of the storage transistors Q1 and Q3 (Q2 and Q4) arranged in the same column are respectively connected to corresponding data lines DL1 and DL2. The source regions of the storage transistors Q1 and Q3 (Q2 and Q4) are connected to a source line SL1 (SL2).

FIG. 16 shows voltage conditions for erasing and programming of data in a memory cell. In FIG. 16, a memory device represents a memory cell and a gate represents a control gate serving as a selective gate of a memory cell. In the case of the negative-voltage-type erasing in FIG. 16, a high electric field necessary for erasing is formed by applying a negative voltage such as −10 V to a control gate. As known from the voltage conditions shown in FIG. 16, simultaneous erasing can be applied to memory cells as least whose sources are connected in common in the case of the positive-voltage-type erasing. Therefore, when the source lines SL1 and SL2 are connected in the structure in FIG. 15, data in the four memory cells Q1 to Q4 can simultaneously be erased. In this case, it is possible to set the size of a memory block optionally by changing the number of memory bits connected to the same source line. The source-line division method includes not only the case typically shown in FIG. 15 in which a data line is used as the unit (common source line is extended in the data line direction) but also a case in which a word line is used as the unit (common source line is extended in the word line direction). Moreover, in the case of the negative-voltage-type erasing, simultaneous erasing can be applied to memory cells whose control gates are connected in common.

Figure 17:
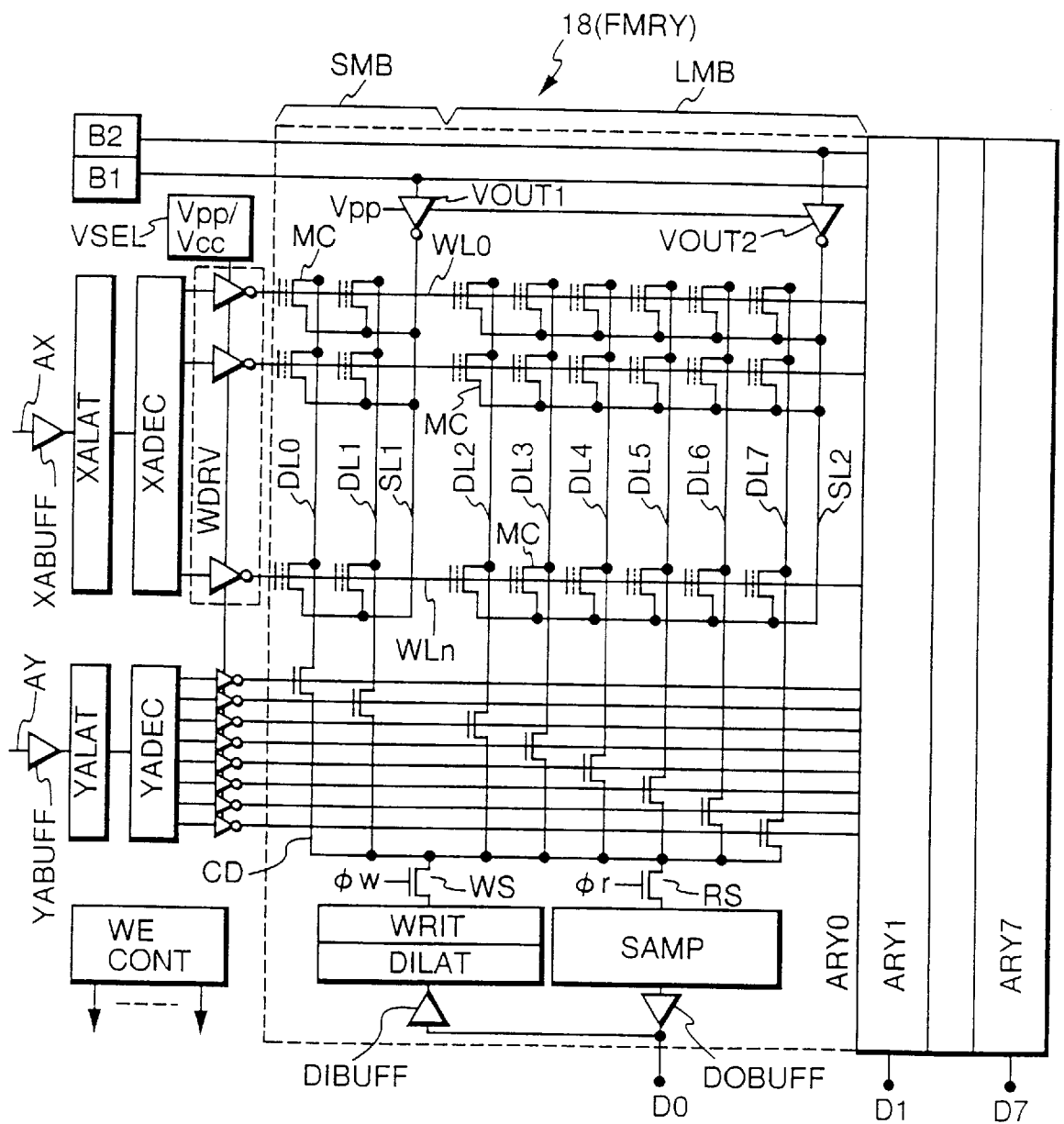
FIG. 17 shows a block diagram of the flash memory 18.

FIG. 17 shows a circuit block diagram of the flash memory 18 in which storage capacities of simultaneously-erasable memory blocks differ from each other.

The flash memory 18 shown in FIG. 17 (hereafter also referred to as an FMRY) has 8-bit data input/output terminals D0 to D7 and each data input/output terminal is provided with memory mats ARY0 to ARY7. The memory mats ARY0 to ARY7, though not restricted, are divided into the following two parts: a memory block with a relatively large storage capacity and a memory block SMB with a relatively small storage capacity. Though a typical memory mat ARY0 is shown in FIG. 17, other memory mats ARY1 to ARY7 are similarly constituted. Moreover, each memory block can have the same storage capacity.

A memory cell MC comprising the insulated-gate field-effect transistor of the two-layer gate structure described in FIG. 13 is arranged like a matrix on each of the memory mats ARY0 to ARY7. Moreover, in FIG. 17, WL0 to WLn are word lines common to all the memory mats ARY0 to ARY7. Control gates of memory cells arranged on the same row are respectively connected to a corresponding word line. Drain regions of memory cells MC arranged on the same column are respectively connected to corresponding data lines DL0 to DL7 in each of the memory mats ARY0 to ARY7. Source regions of memory cells MC constituting the memory block SMB are connected to the source line SL1 in common and source regions of memory cells MC constituting the memory block LMB are connected to the source line SL2 in common.

A high voltage Vpp used for erasing is supplied to the source lines SL1 and SL2 from voltage output circuits VOUT1 and VOUT2. Output operations of the voltage output circuits VOUT1 and VOUT2 are selected in accordance with values of bits B1 and B2 of an erasing-block designation register. For example, when "1" is set to the bit B1 of the erasing-block designation register, only the memory block SMB of each of the memory mats ARY0 to ARY7 is made simultaneously erasable. When "1" is set to the bit B2 of the erasing-block designation register, only the memory block LMB of each of the memory mats ARY0 to ARY7 is made simultaneously erasable. When "1" is set to the both bits B1 and B2, the whole flash memory is made simultaneously erasable.

Selection of the word lines WL0 to WLn is performed when a low address decoder XADEC decodes a low address signal AX captured through a low address buffer XABUFF and a low address latch XALAT. A word driver WDRV drives a word line in accordance with a selection signal output from the low address decoder XADEC. In the case of data reading, the word driver WDRV operates by using a voltage Vcc such as 5 V supplied from a voltage selection circuit VSEL and an earth potential such as 0 V as its power supplies, drives a word line to be selected to a selection level by the voltage Vcc, and keeps a word line to be non-selected at a non-selection level such as the earth potential. In the case of data programming, the word driver WDRV operates by using the voltage Vpp such as 12 V supplied from the voltage selection circuit VSEL and an earth potential such as 0 V as its power supplies and drives a word line to be selected to a programming high-voltage level. In the case of data erasing, the output of the word driver WDRV is set to a low voltage level such as 0 V.

In each of the memory mats ARY0 to ARY7, the data lines DL0 to DL7 are connect to a common data line CD in common through column selection switches YS0 to YS7. The column selection switches YS0 to YS7 are controlled by the fact that a column address decoder YADEC decodes a column address signal AY captured through a column address buffer YABUFF and a column address latch YALAT. Selection signals output from the column address decoder YADEC are supplied to all the column address mats ARY0 to ARY7 in common. Therefore, when any one of the selection signals output from the column address decoder YADEC is set to a selection level, one data line is connected to the common data line CD in each of the memory mats ARY0 to ARY7.

Data read out of the memory cell MC to the common data line CD is supplied to a sense amplifier SAMP through a selection switch RS, amplified by the amplifier SAMP, and output to an external unit from a data output buffer DOBUFF through a data output latch DOLAT. The selection switch RS is set to a selection level synchronously with reading. Programming data supplied from an external unit is held by a data input latch circuit DILAT through a data input buffer DIBUFF. When the data held by the data input latch circuit DILAT is set to "0", a programming circuit WRIT supplies a high voltage for programming to the common data line CD through a selection switch WS. The high voltage for programming is supplied to a drain of a memory cell to whose control gate a high voltage is applied through a data line selected by a column address signal AY in accordance with the low address signal AX and thereby, data is programmed in the memory cell. The selection switch WS is set to a selection level synchronously with programming. A programming and erasing control circuit WECONT generates various timings for programming and erasing and voltage selection control.

Figure 18:
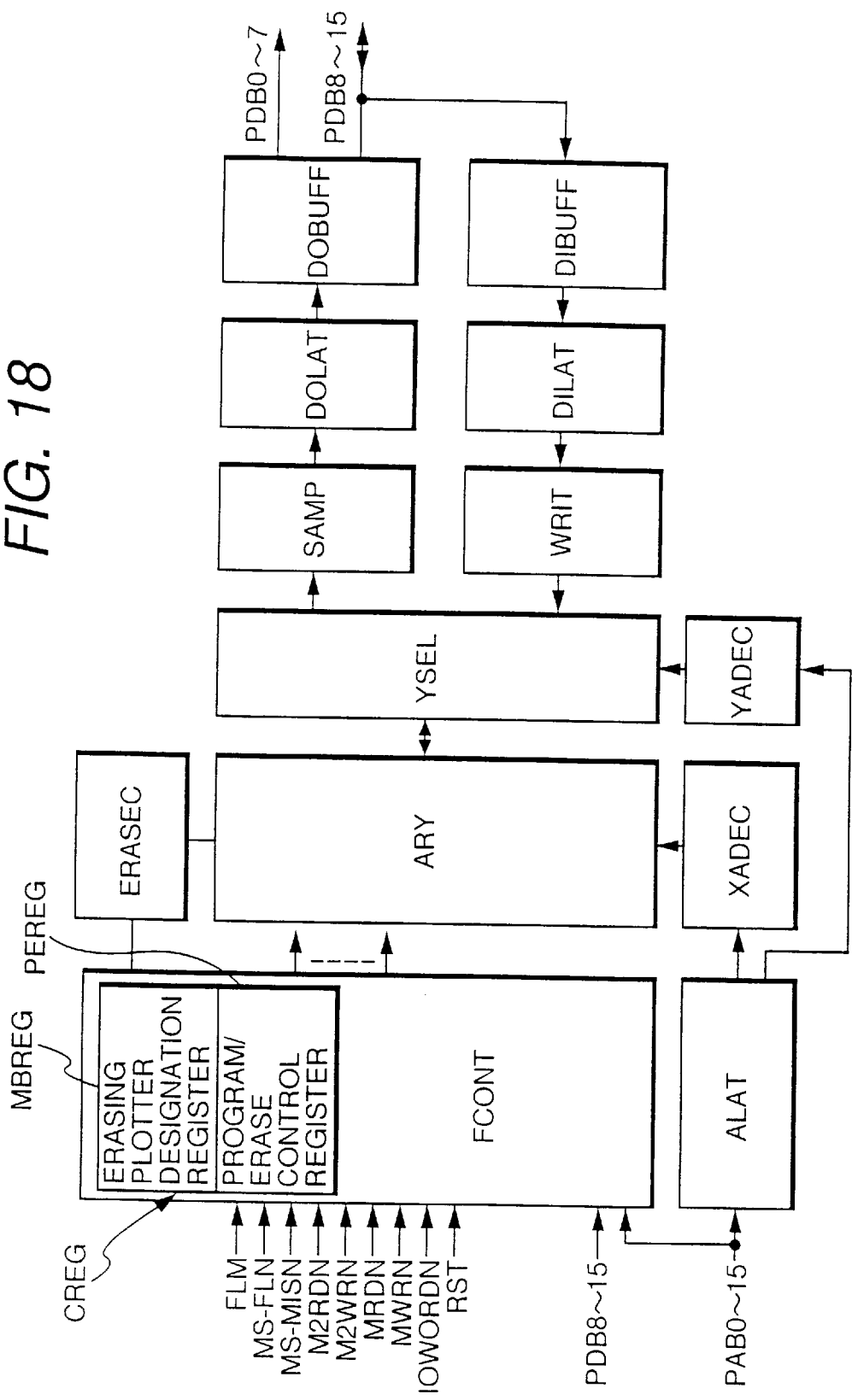
FIG. 18 shows the whole block diagram of the flash memory 18.

FIG. 18 shows the whole block diagram of the flash memory 18 (FMRY) built in the microcomputer 30 in FIG. 1. In FIG. 18, symbol ARY represents a memory array formed by arranging a memory cell comprising the insulated-gate field-effect transistor of a two-layer gate structure described in FIG. 13 like a matrix. In the case of the memory array ARY, similarly to the structure described in FIG. 17, control gates of memory cells are respectively connected to a corresponding word line, drain regions of them are respectively connected to a corresponding data line, and source regions of them are connected to a common source line in every memory block. However, the memory block dividing state is different from that in FIG. 17. For example, the memory block is divided into seven large memory blocks (large blocks) LMB0 to LMB6 each of which has a relatively large storage capacity and eight small memory blocks (small blocks) SMB0 to SMB7 each of which has a relatively small storage capacity. The large memory blocks are used for a program storage area or a large-capacity data storage area. The small memory blocks are used for a small-capacity data storage area or the like.

In FIG. 18, symbol ALAT represents a latch circuit for address signals PAB0 to PAB15. In the first operation mode (operation mode other than the PROM mode), the address signals PAB0 to PAB15 are supplied from the address bus 24 corresponding to the address signal output from the central processing unit CPU 12. In the second operation mode (PROM mode), the address signals PAB0 to PAB15 correspond to the address signal output from a PROM writer. Symbol XADEC represents a low address decoder for decoding a low address signal captured through the address latch ALAT. Symbol WDRV represents a word driver for driving a word line in accordance with a selection signal output from the low address decoder XADEC. The word driver WDRV drives a word line at a voltage such as 5 V in the case of data reading and drives a word line at a high voltage such as 12 V in the case of data programming. In the case of data erasing, every output of the word driver WDRV is set to a low voltage level such as 0 V. Symbol YADEC represents a column address decoder for decoding a column address signal captured through the address latch YALAt. Symbol YSEL represents a column address decoder for selecting a data line in accordance with a selection signal output from the column address decoder YADEC. Symbol SAMP represents a sense amplifier for amplifying a signal read out of a data line selected by the column selection circuit YSEL. Symbol DOLAT represents a data output latch for holding an output of the sense amplifier. Symbol DOBUFF represents a data output buffer for output data held by the data output latch DOLAT to an external unit. In FIG. 18, PDB0 to PDB7 are low-order 8-bit (1 byte) data to be supplied to the data bus 26 in FIG. 1 and PDB8 to PDB15 are high-order 8-bit (1 byte) data to be supplied to the data bus 25 in FIG. 1. According to this example, output data is up to 2 bytes. Symbol DIBUFF represents a data input buffer for capturing the programming data supplied from an external unit. The data captured from the data input buffer DIBUFF is held by the data input latch circuit DILAT. When the data held by the data input latch circuit DILAT is set to "0", the programming circuit WRIT supplies a high voltage for programming to a data line selected by the column selection circuit YSEL. The high voltage for programming is supplied to the drain of a memory cell to whose control gate a high voltage is applied in accordance with a low address signal and thereby, data in the memory cell is programmed. Symbol ERASEC represents an erasing circuit for supplying a high voltage for erasing to the source line of a designated memory block to simultaneously erase the data in the memory block.

Symbol FCONT represents a control circuit for performing control of the timing for reading data from the flash memory FMRY and control of various timings for programming and erasing and voltage selection. The control circuit FCONT is provided with a control register CREG.

FIG. 19 shows a control register CREG. Each control register CREG comprises an 8-bit program/erase control register PEREG and erasing-block designation registers MBREG1 and MBREG2. In the program/erase control register PEREG, Vpp represents a high-voltage applying flag to be set to "1" correspondingly to application of a high voltage for reloading. E bit is used as an erasing indication bit and EV bit is used as a verifying indication bit for erasing. P bit is used as a programming indication bit and PV pit is used as a verifying indication bit for programming. The erasing-block designation registers MBREG1 and MBREG2 are registers for designating a memory block to be erased among the large block divided into 7 parts and the small block divided into 8 parts and the zero-th to seventh bits of the resisters are used as bits for designating each memory block. For example, the bit set to "1" represents selection of a corresponding memory block and the bit set to "0" represents non-selection of the corresponding memory block. For example, when the seventh bit of the erasing-block designation register MBREG2 is set to "1", erase of the data in the small memory block SMB7 is designated.

The control register CREG is set so that data can be read from or written in the register by an external unit. The control circuit FCONT refers to the contents set in the control register CREG and controls erasing or programming in accordance with the contents. It is possible to control the erasing or programming state by reloading the contents of the control register CREG through an external unit.

In FIG. 18, control signals FLM, MS-FLN, MS-MISN, M2RDN, M2WRN, MRDN, MWRN, IOWORDN, and RST are supplied to the control circuit FCONT and moreover, predetermined bits of high-order one-byte data PDB8 to PDB15 and address signals PAB0 to PAB15 are given to the circuit FCONT.

The control signal FLM is a signal for designating an operation mode of the flash memory FMRY, and the signal set to "0" designates the first operation mode of the flash memory and the signal set to "1" designates the second operation mode of it. The signal FLM is formed in accordance with, for example, the mode signals MD0 to MD2.

The control signal MS-FLM is a signal for selecting the flash memory FMRY, and the signal set to "0" designates selection and the signal set to "1" designates non-selection. In the first operation mode, a central processing unit CPU outputs the control signal MS-FLN. In the second operation mode, the control signal MS-FLN is made to correspond to a chip enable signal CE* supplied from a PROM writer PRW.

The control signal MS-MISN is a signal for selecting the control register CREG. In this case, a register to be selected among the program/erase control register PEREG and the erasing-block designation registers MBREG1 and MBREG2 is determined by referring to a predetermined bit of the address signals PAB0 to PAB15. In the first operation mode, a central processing unit CU outputs the control signal MS-MISN. In the second operation mode, though not restricted, the most-significant address bit EA16 is regarded as the control signal MS-MISN.

The M2RDN is a memory read strobe signal, M2WRN is a memory write strobe signal, MRDN is a read signal for the control register CREG, and MWRN is a write signal for the control register CREG. In the first operation mode, a central processing unit CPU outputs these control signals. In the second operation mode, though not restricted, a write enable signal WE* supplied from a PROM writer is regarded as the signal M2WRN or MWRN and an output enable signal OE* is regarded as the signal M2RDN or MRDN. The memory write strobe signal M2WRN is regarded as a strobe signal for programming the data to be programmed in a memory cell in the data input latch circuit DILAT. Actual programming of data in the memory cell is started by setting the P bit of the control register CREG.

The IOWORDN is used as a signal for switching between 8-bit read access and 16-bit read access for the flash memory FMRY. In the second operation mode, the control signal IOWORDN is fixed to a logical value for indicating 8-bit read access.

The RST is a reset signal for the flash memory FMRY. When he flash memory FMRY is reset by the signal RST or the Vpp flag of the program/erase control register PEREG is set to "0", the mode setting bits EV, PV, E, and P of the program/erase control register PEREG are cleared. Therefore, the output of the gate G7 shown in FIG. 7 is used as the reset signal RST and thereby, each bit of the control register PEREG can be cleared.

The invention made by the present inventor is concretely described above in accordance with the embodiment. However, it is needless to say that the present invention is not restricted to the embodiment but various modifications of the present invention are allowed as long as the modifications do not deviate from the gist of the present invention.

For example, though the above embodiment performs programming of data in a flash memory by hot electrons, it is possible to use an embodiment for performing the programming by the tunnel effect.

Moreover, though the above embodiment uses a flash memory as the built-in ROM 18, it is also possible to use other semiconductor memory allowing on-board programming like the user program mode such as an EPROM.

The above description is mainly made on a case in which the invention made by the present inventor is applied to a single-chip computer in the field of the application which is the background of the invention. However, the present invention is not restricted to the single-chip microcomputer but it is possible to widely apply the present invention to various data processors.

The present invention can be applied to an object by premising that the object includes at least an electrically erasable or programmable program memory.

Advantages of a typical invention among the inventions disclosed in this application are briefly described below.

That is, a malfunction due to an interrupt during erasing or programming of the data in the above program memory is excluded by malfunction exclusion means when no correct data is present in the program memory and thereby, it is possible to improve the safety of a system at the time of on-board programming of the program memory.

A part of random-accessible storage means is moved to the vector address area of a program memory in accordance with an interrupt request generated during erasing or programming of the data in the program memory and thereby, a correct vector address can be obtained for occurrence of the interrupt during erasing or programming of the data in the program memory and thus, it is possible to improve the safety of a system at the time of on-board programming of the program memory.

Because the vector address area of a program memory is moved to storage means in accordance with an interrupt request generated during erasing or programming of the data in the program memory and thereby, a correct vector address can be obtained for occurrence of the interrupt during erasing or programming of the data in the program memory and thus, it is possible to improve the safety of a system at the time of on-board programming of the program memory.

Because an interrupt request for a central processing unit is excluded during erasing or programming of the data in a program memory in accordance with an erasing or programming request to the program memory, it is possible to improve the safety of a system at the time of on-board programming of the program memory.

Because the processing for erasing or programming the data in a program memory is stopped in response to an interrupt request generated for a central processing unit during erasing or programming of the data in the program memory in accordance with a request for erasing or programming the data in the program memory, it is possible to improve the safety of a system at the time of on-board programming of the program memory.

Therefore, erasing or programming of the data in a flash memory is automatically stopped even for an interrupt request erroneously generated due to an error in generating a program for erasing or programming data in a flash memory (a reloading control program), a malfunction, or an error in operating an external circuit and thereby, it is possible to protect the flash memory from an abnormal state such as over-erasing or over-programming of the data in the flash memory or an intermediate state by executing the processing for recording the state of stopping erasing or programming of the data in the flash memory during interrupt processing. Therefore, it is possible to protect a microcomputer-applied system from breakdown.

What is claimed is:

1. A data processor formed on a semiconductor substrate, comprising:

an electrically erasable or programmable non-volatile program memory;

a central processing unit capable of accessing the non-volatile program memory; and malfunction exclusion means for excluding a malfunction interrupt of the central processing unit during erasing or programming of a data in the non-volatile program memory.

2. A data processor formed on a semiconductor substrate comprising:

an electrically erasable or programmable non-volatile program memory;

a central processing unit capable of accessing the non-volatile program memory;

a storage circuit for realizing random access by the central processing unit; and a control circuit for moving a part of the storage circuit to a vector address area of the non-volatile program memory, wherein, in accordance with an interrupt request generated during erasing or programming of data in the non-volatile program memory, the part of the storage circuit is accessed and not the vector address area of the non-volatile program memory.

3. A data processor formed on a semiconductor substrate, comprising:

an electrically erasable or programmable non-volatile program memory;

a central processing unit capable of accessing the non-volatile program memory;

a storage circuit for realizing random access by the central processing unit; and a control circuit for moving the vector address area of the non-volatile program memory to the storage circuit, wherein, in accordance with an interrupt request generated during erasing or programming of data in the non-volatile program memory, the storage circuit is accessed and not the vector address area of the non-volatile program memory.

4. A data processor formed on a semiconductor substrate, comprising:

an electrically erasable or programmable non-volatile program memory;

a central processing unit capable of accessing the non-volatile program memory; and a control logic circuit for excluding an interrupt request to the central processing unit during erasing or programming of data in the non-volatile program memory in accordance with a request for erasing or programming the data in the non-volatile program memory.

5. A data processor comprising:

an electrically erasable or programmable program memory;

a central processing unit capable of accessing the program memory; and a control logic circuit for stopping the processing for erasing or programming of data in the program memory in response to an interrupt request generated to the central processing unit during erasing or programming of the data in the program memory in accordance with a request for erasing or programming the data in the program memory.

6. A data processor formed on a semiconductor substrate, comprising:

a central processing unit;

an electrically erasable and programmable non-volatile memory comprising:
 a first area that stores one or more vector addresses, and
 a second area that stores one or more operation programs;

a mode control circuit coupled to receive external signals and setting an operation mode of the data processor in accordance with the external signals, wherein operation modes of the data processor include:
 a normal operation mode, wherein the central processing unit executes one or more operation programs stored in the electrically erasable and programmable non-volatile memory, and
 an erasing or programming mode, wherein the electrically erasable and programmable non-volatile memory is accessed under control of the central processing unit to erase or program one or more operation programs in the electrically erasable and programmable non-volatile memory;

an interrupt control circuit coupled to the central processing unit that generates an interrupt request in response to an interrupt input signal; and a circuit for terminating the erasing or programming of the electrically erasable and programmable non-volatile memory in response to an interrupt request generated while the data processor operates in the erasing or programming mode.

7. A data processor according to claim 6, further comprising a memory coupled to the central processing unit and storing a control program, wherein the control program is executed for controlling the erasing or programming of the one or more operation programs in the electrically erasable and programmable non-volatile memory.

8. A data processor according to claim 7, wherein the memory comprises a random access memory.

9. A data processor according to claim 6, further comprising:

a first control register having a first control bit, wherein a first state of the first control bit enables the central processing unit to erase one or more programs in the electrically erasable and programmable non-volatile memory, and wherein a second state of the first control bit disables the central processing unit from erasing one or more programs in the electrically erasable and programmable non-volatile memory, wherein the circuit is responsive to the interrupt request, wherein the first control bit is set into the second state in response to the interrupt request.

10. A data processor according to claim 9, wherein the electrically erasable and programmable non-volatile memory comprises a memory array, wherein the memory array is divided into a plurality of memory blocks, wherein each of the memory blocks comprises a unit of memory that may be simultaneously erased, and wherein the data processor further comprises a second control register comprising bits for storing data representing one or more memory blocks to be erased.

11. A data processor according to claim 6, wherein the interrupt request comprises a non-maskable interrupt request.

12. A single chip data processor comprising:

a central processing unit;

an electrically erasable and programmable non-volatile memory comprising:
 a first area for storing a vector address, and
 a second area for storing one or more operation programs;

a mode control circuit coupled to receive external signals and setting an operation mode of the data processor in accordance with the external signals, wherein operation modes of the data processor include:
 a normal operation mode, wherein the central processing unit executes one or more operation programs stored in the second area when operating in the normal mode, and
 an erasing or programming mode, wherein the electrically erasable and programmable non-volatile memory is erased or programmed when the central processing unit operates in the erasing or programming mode, an interrupt control circuit generating an interrupt request in response to an input signal thereof;

a first register for controlling an operation mode of the electrically erasable and programmable non-volatile memory, wherein the first register comprises:
 a first control bit having a set state and a reset state, wherein the set state of the first control bit enables the central processing unit to erase one or more programs in the second area, and wherein the reset state of the first control bit disables the central processing unit from erasing one or more programs in the second area, and
 a second control bit having a set state and a reset state, wherein the set state of the second control bit enables the central processing unit to program one or more programs in the second area, and wherein the reset state of the second control bit disables the central processing unit from programming one or more programs in the second area; and a circuit coupled to the interrupt control circuit, wherein the circuit sets the first and second control bits to the reset state in response to an interrupt request generated while the data processor operates in the erasing or programming mode.

13. A single chip data processor according to claim 12, wherein the first register further comprises:

a third control bit having a set state and a reset state, wherein the set state of the third control bit enables the central processing unit to verify the erasing or programming of the one or more programs in the second area, and wherein the reset state of the third control bit disables the central processing unit from verifying the erasing or programming of the one or more programs in the second area, wherein the circuit sets the third control bit to the reset state in response to an interrupt request generated while the central processing unit operates in the erasing or programming mode.

14. A single chip data processor according to claim 12, further comprising a memory for storing a control program for erasing or programming one or more operation programs in the electrically erasable and programmable non-volatile memory, wherein the central processing unit executes the control program while operating in the erasing or programming mode.

15. A single chip data processor according to claim 14, wherein the memory comprises a random access memory.

16. A data processor according to claim 12, wherein the electrically erasable and programmable non-volatile memory comprises a memory array, wherein the memory array is divided into a plurality of memory blocks, wherein each of the memory blocks comprises a unit of memory that may be simultaneously erased, and wherein the data processor further comprises:
a second register comprising bits for storing data representing one or more memory blocks to be erased.

17. A single chip data processor according to claim 12, wherein the interrupt request comprises a non-maskable interrupt request.

18. A single chip data processor comprising:

a central processing unit;

an electrically erasable and programmable non-volatile memory for storing one or more vector addresses and operation programs;

an external terminal to which a voltage is applied for erasing or programming of the electrically erasable and programmable non-volatile memory, wherein the central processing unit and electrically erasable and programmable non-volatile memory operate in a mode to erase or program the electrically erasable and programmable non-volatile memory responsive to the voltage;

a detection circuit coupled to the external terminal and providing a signal in response to application of the voltage;

an interrupt control circuit for providing an interrupt request in response to an input signal thereof; and a circuit responsive to the signal and coupled to the central processing unit, wherein the circuit prevents the interrupt request from interrupting the central processing unit during the erasing or programming mode of the electrically erasable and programmable non-volatile memory.

19. A single chip data processor according to claim 18, wherein the circuit prevents an interrupt signal from being transferred to the central processing unit during the erasing or programming mode of the electrically erasable and programmable non-volatile memory.

20. A single chip data processor according to claim 18, further comprising a memory for storing a control program for erasing or programming one or more operation programs in the electrically erasable and programmable non-volatile memory, wherein the central processing unit executes the control program while operating in the erasing or programming mode.

21. A single chip data processor according to claim 18, wherein the memory comprises a random access memory.

22. A single chip data processor according to claim 18, wherein the interrupt request comprises a non-maskable interrupt request.

23. A single chip data processor comprising:

a random access memory;

an electrically erasable and programmable non-volatile memory comprising a first vector address area for storing a vector address, a first processing routine area for storing a processing routine for the vector address and an area storing one or more operation programs;

an external terminal, wherein a voltage for erasing or programming the electrically erasable and programmable non-volatile memory is supplied to the external terminal at a time when the electrically erasable and programmable non-volatile memory is in an erasing or a programming mode;

a central processing unit, wherein the central processing unit stores contents of the first vector address area and the first processing routine area in the electrically erasable and programmable non-volatile memory into a second vector address area and a second processing routine area in the random access memory, respectively, in response to the erasing or programming mode for the electrically erasable and programmable non-volatile memory;

an interrupt control circuit for providing an interrupt request to the central processing unit in response to an input signal thereof; and a control circuit, wherein the central processing unit fetches the vector address from the random access memory and accesses the second processing routine area in the random access memory in accordance with the fetched vector address responsive to a signal supplied from the control circuit, wherein the signal from the control circuit is supplied in response to an interrupt request during the erasing or programming mode for the electrically erasable and programmable non-volatile memory.

24. A single chip data processor according to claim 23, wherein the control circuit comprises an address conversion circuit for converting a first address signal into a second address signal, wherein the first address is generated from the central processing unit responding to the interrupt request during the erasing or the programming mode for the electrically erasable and programmable non-volatile memory, wherein the first address designates an address for the vector address area in the electrically erasable and programmable non-volatile memory, and wherein the second address designates an address in the second vector address area in the random access memory.

25. A single chip data processor according to claim 24, further comprising:

an external terminal to which a voltage for erasing or programming the electrically erasable and programmable non-volatile memory is applied at a time when the electrically erasable and programmable non-volatile memory is to operate in the erasing or the programming mode;

a detection circuit coupled to the external terminal for providing a signal in response to application of the voltage; and a bit to which the central processing unit writes data, wherein data in the bit indicates that the first vector address area is moved to the second vector address area, wherein the address conversion circuit is activated in response to the signal from the detection circuit and data in the bit.

* * * * *